US009350561B1

(12) United States Patent
Schafer et al.

(10) Patent No.: US 9,350,561 B1
(45) Date of Patent: May 24, 2016

(54) VISUALIZING THE FLOW OF RESOURCES IN AN ALLOCATION MODEL

(71) Applicant: Apptio, Inc., Bellevue, WA (US)

(72) Inventors: Zane Texiera Schafer, Petaluma, CA (US); Matthew Russell Halls, Kenmore, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/722,663

(22) Filed: May 27, 2015

(51) Int. Cl.
| H04L 12/26 | (2006.01) |
| H04L 29/08 | (2006.01) |
| H04L 29/06 | (2006.01) |
| H04L 12/24 | (2006.01) |
| G06Q 10/06 | (2012.01) |
| G06F 9/455 | (2006.01) |
| G06F 15/17 | (2006.01) |

(52) U.S. Cl.
CPC ............ *H04L 12/2621* (2013.01); *G06Q 10/06* (2013.01); *H04L 12/24* (2013.01); *H04L 12/26* (2013.01); *H04L 29/06* (2013.01); *H04L 29/08783* (2013.01); *H04L 41/04* (2013.01); *G06F 9/455* (2013.01); *G06F 15/17* (2013.01); *G06Q 10/0631* (2013.01)

(58) Field of Classification Search
None
See application file for complete search history.

(56) References Cited

U.S. PATENT DOCUMENTS

| 4,744,026 A | 5/1988 | Vanderbei |
| 5,249,120 A | 9/1993 | Foley |
| 5,615,121 A * | 3/1997 | Babayev ............ G06Q 10/06 700/100 |
| 5,721,919 A | 2/1998 | Morel et al. |
| 5,799,286 A | 8/1998 | Morgan et al. |
| 5,802,508 A | 9/1998 | Morgenstern |
| 5,970,476 A | 10/1999 | Fahey |
| 5,991,741 A | 11/1999 | Speakman et al. |
| 6,014,640 A | 1/2000 | Bent |
| 6,032,123 A | 2/2000 | Jameson |
| 6,047,290 A | 4/2000 | Kennedy et al. |

(Continued)

FOREIGN PATENT DOCUMENTS

JP 2011134268 A 7/2011

OTHER PUBLICATIONS van Diessen, Raymond J., Barbara Sierman, and Christopher A. Lee. "Component business model for digital repositories: A framework for analysis."Proc. iPRES 2008 (2008).*

(Continued)

*Primary Examiner* — Gurkanwaljit Singh
(74) *Attorney, Agent, or Firm* — John W. Branch; Lowe Graham Jones PLLC

(57) ABSTRACT

Embodiments are directed towards visualizing the flow of resources in an allocation model. A visualization model may be selected based on an underlying allocation model. The visualization model may include visualization model items. Allocation model items in the allocation model may be mapped to the visualization model items included in the visualization model. If a visualization model item is selected, the source visualization model items that provide resources to the selected visualization model item may be determined. And, the target visualization model items that receive resources from the selected visualization model item may be determined. Input flow lines that start from the source visualization model items and end at the selected visualization model item may be generated and displayed. And, output flow lines that start from the selected visualization model item and end at the target visualization model items may be generated and displayed.

30 Claims, 20 Drawing Sheets

(56) References Cited

U.S. PATENT DOCUMENTS

| | | | |
|---|---|---|---|
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 | 1/2003 | Suh | |
| 6,578,005 B1 | 6/2003 | Lesaint et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,308,427 B1 | 12/2007 | Hood | |
| 7,321,869 B1 | 1/2008 | Phibbs, Jr. | |
| 7,590,937 B2 | 9/2009 | Jacobus et al. | |
| 7,634,431 B2 | 12/2009 | Stratton | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,774,458 B2 | 8/2010 | Trinon et al. | |
| 7,783,759 B2 | 8/2010 | Eilam et al. | |
| 7,813,948 B2 | 10/2010 | Ratzloff | |
| 7,877,742 B2 | 1/2011 | Duale et al. | |
| 7,899,235 B1 | 3/2011 | Williams et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 8,010,584 B1 | 8/2011 | Craver et al. | |
| 8,024,241 B2 | 9/2011 | Bailey et al. | |
| 8,175,863 B1 | 5/2012 | Ostermeyer et al. | |
| 8,200,518 B2 | 6/2012 | Bailey et al. | |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,423,428 B2 | 4/2013 | Grendel et al. | |
| 8,484,355 B1 | 7/2013 | Lochhead et al. | |
| 8,601,263 B1 | 12/2013 | Shankar et al. | |
| 8,768,976 B2 | 7/2014 | McLachlan et al. | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0107914 A1* | 8/2002 | Charisius | G06Q 10/06 709/203 |
| 2002/0123945 A1 | 9/2002 | Booth et al. | |
| 2002/0145040 A1 | 10/2002 | Grabski, III | |
| 2002/0156710 A1 | 10/2002 | Ryder | |
| 2002/0178198 A1 | 11/2002 | Steele | |
| 2003/0074269 A1 | 4/2003 | Viswanath | |
| 2003/0083888 A1 | 5/2003 | Argenton et al. | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172368 A1 | 9/2003 | Alumbaugh et al. | |
| 2003/0195780 A1 | 10/2003 | Arora et al. | |
| 2003/0236721 A1 | 12/2003 | Plumer et al. | |
| 2004/0059611 A1 | 3/2004 | Kananghinis et al. | |
| 2004/0093344 A1 | 5/2004 | Berger et al. | |
| 2004/0111509 A1 | 6/2004 | Eilam et al. | |
| 2004/0186762 A1 | 9/2004 | Beaven et al. | |
| 2004/0243438 A1 | 12/2004 | Mintz | |
| 2005/0004856 A1 | 1/2005 | Brose et al. | |
| 2005/0060298 A1 | 3/2005 | Agapi et al. | |
| 2005/0060317 A1 | 3/2005 | Lott et al. | |
| 2005/0091102 A1 | 4/2005 | Retsina | |
| 2005/0120032 A1 | 6/2005 | Liebich et al. | |
| 2005/0171918 A1 | 8/2005 | Eden et al. | |
| 2006/0041458 A1 | 2/2006 | Ringrose et al. | |
| 2006/0080264 A1 | 4/2006 | Zhang et al. | |
| 2006/0085302 A1 | 4/2006 | Weiss et al. | |
| 2006/0085465 A1 | 4/2006 | Nori et al. | |
| 2006/0106658 A1 | 5/2006 | Johanson et al. | |
| 2006/0126552 A1* | 6/2006 | Lee | H04B 7/2123 370/321 |
| 2006/0161879 A1 | 7/2006 | Lubrecht et al. | |
| 2006/0167703 A1 | 7/2006 | Yakov | |
| 2006/0178960 A1 | 8/2006 | Lepman | |
| 2006/0179012 A1 | 8/2006 | Jacobs | |
| 2006/0190497 A1 | 8/2006 | Inturi et al. | |
| 2006/0200400 A1* | 9/2006 | Hunter | G06Q 10/00 705/36 R |
| 2006/0200477 A1 | 9/2006 | Barrenechea | |
| 2006/0212334 A1 | 9/2006 | Jackson | |
| 2006/0224740 A1 | 10/2006 | Sievers-Tostes | |
| 2006/0224946 A1 | 10/2006 | Barrett et al. | |
| 2006/0228654 A1 | 10/2006 | Sanjar et al. | |
| 2006/0282429 A1 | 12/2006 | Hernandez-Sherrington et al. | |
| 2007/0113289 A1 | 5/2007 | Blumenau | |
| 2007/0124162 A1 | 5/2007 | Mekyska | |
| 2007/0198982 A1 | 8/2007 | Bolan et al. | |
| 2007/0214413 A1 | 9/2007 | Boeckenhauer | |
| 2007/0226090 A1 | 9/2007 | Stratton | |
| 2007/0260532 A1 | 11/2007 | Blake, III | |
| 2007/0271203 A1 | 11/2007 | Delvat | |
| 2007/0276755 A1 | 11/2007 | Rapp | |
| 2007/0282626 A1 | 12/2007 | Zhang et al. | |
| 2008/0033774 A1 | 2/2008 | Kimbrel et al. | |
| 2008/0065435 A1 | 3/2008 | Ratzloff | |
| 2008/0071844 A1 | 3/2008 | Gopal et al. | |
| 2008/0201269 A1 | 8/2008 | Hollins et al. | |
| 2008/0208647 A1 | 8/2008 | Hawley et al. | |
| 2008/0295096 A1 | 11/2008 | Beaty et al. | |
| 2008/0312979 A1 | 12/2008 | Lee et al. | |
| 2009/0012986 A1 | 1/2009 | Arazi et al. | |
| 2009/0018880 A1 | 1/2009 | Bailey et al. | |
| 2009/0100017 A1 | 4/2009 | Graves et al. | |
| 2009/0100406 A1 | 4/2009 | Greenfield et al. | |
| 2009/0144120 A1 | 6/2009 | Ramachandran | |
| 2009/0150396 A1 | 6/2009 | Elisha et al. | |
| 2009/0198535 A1 | 8/2009 | Brown et al. | |
| 2009/0216580 A1 | 8/2009 | Bailey et al. | |
| 2009/0234892 A1 | 9/2009 | Anglin et al. | |
| 2009/0300173 A1 | 12/2009 | Bakman et al. | |
| 2009/0319316 A1 | 12/2009 | Westerfeld et al. | |
| 2010/0005014 A1 | 1/2010 | Castle et al. | |
| 2010/0005173 A1 | 1/2010 | Baskaran et al. | |
| 2010/0042455 A1 | 2/2010 | Liu et al. | |
| 2010/0049494 A1 | 2/2010 | Radibratovic et al. | |
| 2010/0082380 A1 | 4/2010 | Merrifield, Jr. et al. | |
| 2010/0094740 A1 | 4/2010 | Richter | |
| 2010/0125473 A1 | 5/2010 | Tung et al. | |
| 2010/0169477 A1 | 7/2010 | Stienhans et al. | |
| 2010/0185557 A1* | 7/2010 | Hunter | G06Q 10/00 705/36 R |
| 2010/0211667 A1 | 8/2010 | O'Connell, Jr. | |
| 2010/0250419 A1 | 9/2010 | Ariff et al. | |
| 2010/0250421 A1 | 9/2010 | Ariff et al. | |
| 2010/0250642 A1 | 9/2010 | Yellin et al. | |
| 2010/0293163 A1 | 11/2010 | McLachlan et al. | |
| 2010/0299233 A1 | 11/2010 | Licardi et al. | |
| 2010/0306382 A1 | 12/2010 | Cardosa et al. | |
| 2010/0325606 A1 | 12/2010 | Sundararajan et al. | |
| 2010/0332262 A1 | 12/2010 | Horvitz et al. | |
| 2010/0333109 A1 | 12/2010 | Milnor | |
| 2011/0016214 A1 | 1/2011 | Jackson | |
| 2011/0016448 A1 | 1/2011 | Bauder et al. | |
| 2011/0022861 A1 | 1/2011 | Agneeswaran et al. | |
| 2011/0066628 A1 | 3/2011 | Jayaraman | |
| 2011/0072340 A1 | 3/2011 | Miller | |
| 2011/0106691 A1 | 5/2011 | Clark et al. | |
| 2011/0167034 A1 | 7/2011 | Knight et al. | |
| 2011/0225277 A1 | 9/2011 | Freimuth et al. | |
| 2012/0023170 A1 | 1/2012 | Matignon et al. | |

(56) References Cited

U.S. PATENT DOCUMENTS

| | | | |
|---|---|---|---|
| 2012/0066020 A1 | 3/2012 | Moon et al. | |
| 2012/0131591 A1 | 5/2012 | Moorthi et al. | |
| 2012/0150736 A1 | 6/2012 | Dickerson et al. | |
| 2012/0185368 A1 | 7/2012 | Schloter et al. | |
| 2012/0232947 A1 | 9/2012 | McLachlan | |
| 2012/0233217 A1 | 9/2012 | Purpus et al. | |
| 2012/0233547 A1 | 9/2012 | McLachlan | |
| 2012/0239739 A1 | 9/2012 | Manglik et al. | |
| 2012/0330869 A1* | 12/2012 | Durham | G06N 5/022 706/16 |
| 2013/0041819 A1 | 2/2013 | Khasho | |
| 2013/0060595 A1 | 3/2013 | Bailey | |
| 2013/0103654 A1 | 4/2013 | McLachlan et al. | |
| 2013/0138470 A1 | 5/2013 | Goyal et al. | |
| 2013/0179371 A1 | 7/2013 | Jain et al. | |
| 2013/0201193 A1 | 8/2013 | McLachlan et al. | |
| 2013/0227584 A1* | 8/2013 | Greene | G06F 9/5083 718/104 |
| 2013/0282537 A1 | 10/2013 | Snider | |
| 2013/0346390 A1 | 12/2013 | Jerzak et al. | |
| 2014/0067632 A1 | 3/2014 | Curtis | |
| 2014/0075004 A1* | 3/2014 | Van Dusen | H04L 41/04 709/223 |
| 2014/0089509 A1 | 3/2014 | Akolkar et al. | |
| 2014/0279201 A1 | 9/2014 | Iyoob et al. | |

OTHER PUBLICATIONS

Melcher, Joachim, and Detlef Seese. "Visualization and clustering of business process collections based on process metric values." Symbolic and Numeric Algorithms for Scientific Computing, 2008. SYNASC'08. 10th International Symposium on. IEEE, 2008.*
Lee, Juhnyoung, and A-A. Ivan. "Value-Centric, Model-Driven Business Transformation." E-Commerce Technology, 2006. The 8th IEEE International Conference on and Enterprise Computing, E-Commerce, and E-Services, The 3rd IEEE International Conference on. IEEE, 2006.*
Lee, Juhnyoung, et al. "Business transformation workbench: A practitioner's tool for business transformation." Services Computing, 2008. SCC'08. IEEE International Conference on. vol. 2. IEEE, 2008.*
Risch et al.; "Interactive information visualization for exploratory intelligence data analysis"; IEEE Proc. 1996 Virtual Reality Ann. Int. Symp.; pp. 230-238, Apr. 1996.*
Office Communication for U.S. Appl. No. 13/415,797 mailed Oct. 19, 2015.
Office Communication for U.S. Appl. No. 13/837,815 mailed Sep. 28, 2015.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Notice from the European Patent Office dated Oct. 1, 2007 concerning business methods," Official Journal EPO, Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project Management," Wikipedia, the free encyclopedia, accessed Mar. 13, 2012, 14 pages http://en.wikipedia.org/wiki/Project_management—last modified Mar. 7, 2012.
"Visualization for Production Management: Treemap and Fisheye Table Browser." Open-Video Organization webpages, 2001, 2 pages http://www.open-video.org/details.php?videoid=4547.
Busch. J. "Six Strategies for IT Cost Allocation," Spend Matters, Jan. 5, 2011 3 pages http://spendmatters.com/2011/01/05/six-strategies-for-it-cost-allocation/.
Morgan, T. P., "Apptio puffs up freebie cost control freak for public clouds." The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 mailed Jul. 14, 2010.
International Preliminary Report on Patentability for International Patent Application No. PCT/US2010/035021 mailed Nov. 24, 2011.
International Search Report and Written Opinion for International Patent Application No. PCT/US2012/028353 mailed Oct. 31, 2012.
International Preliminary Report on Patentability for International Patent Application No. PCT/US2012/028353 mailed Sep. 19, 2013.
International Search Report and Written Opinion for International Patent Application No. PCT/US2012/028378 mailed on Sep. 12, 2012.
International Preliminary Report on Patentability for International Patent Application No. PCT/US2012/028378 mailed Sep. 19, 2013.
Extended European Search Report in EP Application No. 13151967.0-1955, mailed Apr. 19, 2013.
Official Communication for U.S. Appl. No. 12/467,120 mailed Oct. 4, 2011.
Official Communication for U.S. Appl. No. 12/467,120 mailed Jun. 20, 2012.
Official Communication for U.S. Appl. No. 12/467,120 mailed Aug. 29, 2012.
Official Communication for U.S. Appl. No. 12/467,120 mailed Oct. 23, 2013.
Official Communication for U.S. Appl. No. 12/467,120 mailed Mar. 26, 2013.
Official Communication for U.S. Appl. No. 13/324,253 mailed Sep. 25, 2012.
Official Communication for U.S. Appl. No. 13/324,253 mailed Jan. 10, 2013.
Official Communication for U.S. Appl. No. 13/324,253 mailed Mar. 19, 2013.
Official Communication for U.S. Appl. No. 13/324,253 mailed Sep. 6, 2013.
Official Communication for U.S. Appl. No. 13/415,797 mailed Oct. 3, 2013.
Official Communication for U.S. Appl. No. 13/452,628 mailed Apr. 22, 2013.
Official Communication for U.S. Appl. No. 13/675,837 mailed Oct. 10, 2013.

(56) References Cited

OTHER PUBLICATIONS

Official Communication for U.S. Appl. No. 13/837,815 mailed Oct. 23, 2013.
Official Communication for U.S. Appl. No. 13/917,478 mailed Nov. 7, 2013.
Official Communication for U.S. Appl. No. 13/917,503 mailed Oct. 10, 2013.
Official Communication for U.S. Appl. No. 13/935,147 mailed Oct. 22, 2013.
Official Communication for U.S. Appl. No. 13/452,628 mailed Nov. 18, 2013.
Official Communication for U.S. Appl. No. 14/033,130 mailed Dec. 16, 2013.
Official Communication for U.S. Appl. No. 13/324,253 mailed Jan. 23, 2014.
Official Communication for U.S. Appl. No. 13/675,837 mailed Jan. 31, 2014.
Official Communication for U.S. Appl. No. 13/917,503 mailed Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives.org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 mailed on Apr. 9, 2014.
Office Communication for U.S. Appl. No. 13/324,253 mailed on Apr. 9, 2014.
Office Communication for U.S. Appl. No. 13/324,253 mailed on Oct. 24, 2014.
Office Communication for U.S. Appl. No. 13/365,150 mailed on Dec. 3, 2014.
Office Communication for U.S. Appl. No. 13/452,628 mailed on Oct. 1, 2014.
Office Communication for U.S. Appl. No. 13/837,815 mailed on Apr. 7, 2014.
Office Communication for U.S. Appl. No. 13/675,837 mailed on Jan. 31, 2014.
Office Communication for U.S. Appl. No. 13/675,837 mailed on Apr. 2, 2014.
Office Communication for U.S. Appl. No. 13/917,503 mailed on Apr. 3, 2014.
Office Communication for U.S. Appl. No. 13/935,147 mailed on Apr. 11, 2014.
Office Communication for U.S. Appl. No. 13/935,147 mailed on Jun. 16, 2014.
Office Communication for U.S. Appl. No. 14/033,130 mailed on May 27, 2014.
Office Communication for U.S. Appl. No. 14/033,130 mailed on Aug. 5, 2014.
Office Communication for U.S. Appl. No. 14/180,308 mailed on Jan. 30, 2015.
Office Communication for U.S. Appl. No. 14/180,308 mailed on Apr. 8, 2014.
Office Communication for U.S. Appl. No. 13/452,628 mailed on Mar. 13, 2014.
SAS Activity-Based Management, 2010, Fact Sheet, 4 pages.
Office Communication for U.S. Appl. No. 14/180,308 mailed on Sep. 2, 2014.
Office Communication for U.S. Appl. No. 14/180,308 mailed on Apr. 17, 2015.
Extended European Search Report in EP Application No. 14159413.5 mailed Jul. 4, 2014.
Office Communication for U.S. Appl. No. 13/415,797 mailed on Jan. 12, 2015.
Office Communication for U.S. Appl. No. 13/837,815 mailed Sep. 25, 2014.
Office Communication for U.S. Appl. No. 13/324.253 mailed on Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 mailed on Feb. 10, 2015.
European Search Report for Application No. 12755613.2 mailed on Jan. 26, 2015.
Office Communication for U.S. Appl. No. 13/452,628 mailed on Mar. 30, 2015.
Office Communication for U.S. Appl. No. 13/917,503 mailed on Apr. 16, 2015.
Office Communication for U.S. Appl. No. 13/675,837 mailed on Apr. 16, 2015.
Office Communication for U.S. Appl. No. 13/837,815 mailed on Apr. 27, 2015.
Office Communication for U.S. Appl. No. 13/452,628 mailed on Jun. 23, 2015.
Office Communication for U.S. Appl. No. 13/415,797 mailed Jul. 23, 2015.
International Search Report and Written Opinion for PCT/US2015/015486 mailed Jun. 29, 2015.
Office Communication for U.S. Appl. No. 13/935,147 mailed Jul. 9, 2015.
Office Communication for U.S. Appl. No. 13/649,019 mailed Sep. 23, 2015.
Office Communication for U.S. Appl. No. 13/365,150 mailed Sep. 24, 2015.
Office Communication for U.S. Appl. No. 14/033,130 mailed Sep. 15, 2015.
Official Communication for U.S. Appl. No. 13/935,147 mailed on Mar. 9, 2016, 10 pages.
Official Communication for U.S. Appl. No. 14/033,130 mailed Feb. 18, 2016, 22 pages.
Official Communication for U.S. Appl. No. 13/649,019 mailed Jan. 4, 2016, 8 pages.
Official Communication for U.S. Appl. No. 14/869,721 mailed Jan. 13, 2016, 57 pages.
Official Communication for U.S. Appl. No. 13/452,628 mailed Jan. 12, 2016, 21 pages.
Office Communication for U.S. Appl. No. 13/415,797 mailed on Oct. 19, 2015, 3 pages.
Office Communication for U.S. Appl. No. 13/837,815 mailed on Sep. 28, 2015, 20 pages.
European Examination Report for Application No. 14159413.5 mailed Jul. 15, 2015, 9 pages.
Office Communication for U.S. Appl. No. 13/415,701 mailed on Oct. 27, 2015, 16 pages.
Office Communication for U.S. Appl. No. 13/365,150 mailed on Dec. 7, 2015, 3 pages.
Office Communication for U.S. Appl. No. 13/675,837 mailed on Oct. 26, 2015, 20 pages.

(56) References Cited

OTHER PUBLICATIONS

Office Communication for U.S. Appl. No. 13/917,503 mailed on Oct. 22, 2015, 19 pages.

Office Communication for U.S. Appl. No. 14/722,663 mailed on Dec. 1, 2015, 37 pages.

Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).

Frans Flippo et al., "A Framework for Rapid Development of Multimodal Interfaces," Proceedings of the 5th International Conference on Multimodal Interfaces, 2003, pp. 109-116 (8 pages).

David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).

Office Communication for U.S. Appl. No. 14/846,349 mailed on Dec. 17, 2015, 23 pages.

* cited by examiner

VISUALIZING THE FLOW OF RESOURCES IN AN ALLOCATION MODEL

TECHNICAL FIELD

The present invention relates generally to computer visualization of resources, and more particularly, but not exclusively to visualizing the flow of resources in an allocation model.

BACKGROUND

Businesses that strive to remain viable and successful in today's competitive commercial environment are required to adopt accurate and responsive resource allocation practices. To improve efficiency, businesses use allocations models that model various resource allocation problems, such as, budgeting, forecasting, cost accounting techniques. Some resource allocation models may become very complex. For example, the complexity of the financial allocation models may increase as the number of tracked activities and elements increases. In some cases, the large number of items and entities required for allocation modeling can make an allocation model difficult to analyze. Also, it may become difficult for users that may be unfamiliar with the implementation details of the allocation model to easily grasp how relevant resources flow through the allocation model. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DETAILED DESCRIPTION OF THE INVENTION

Figure 1:
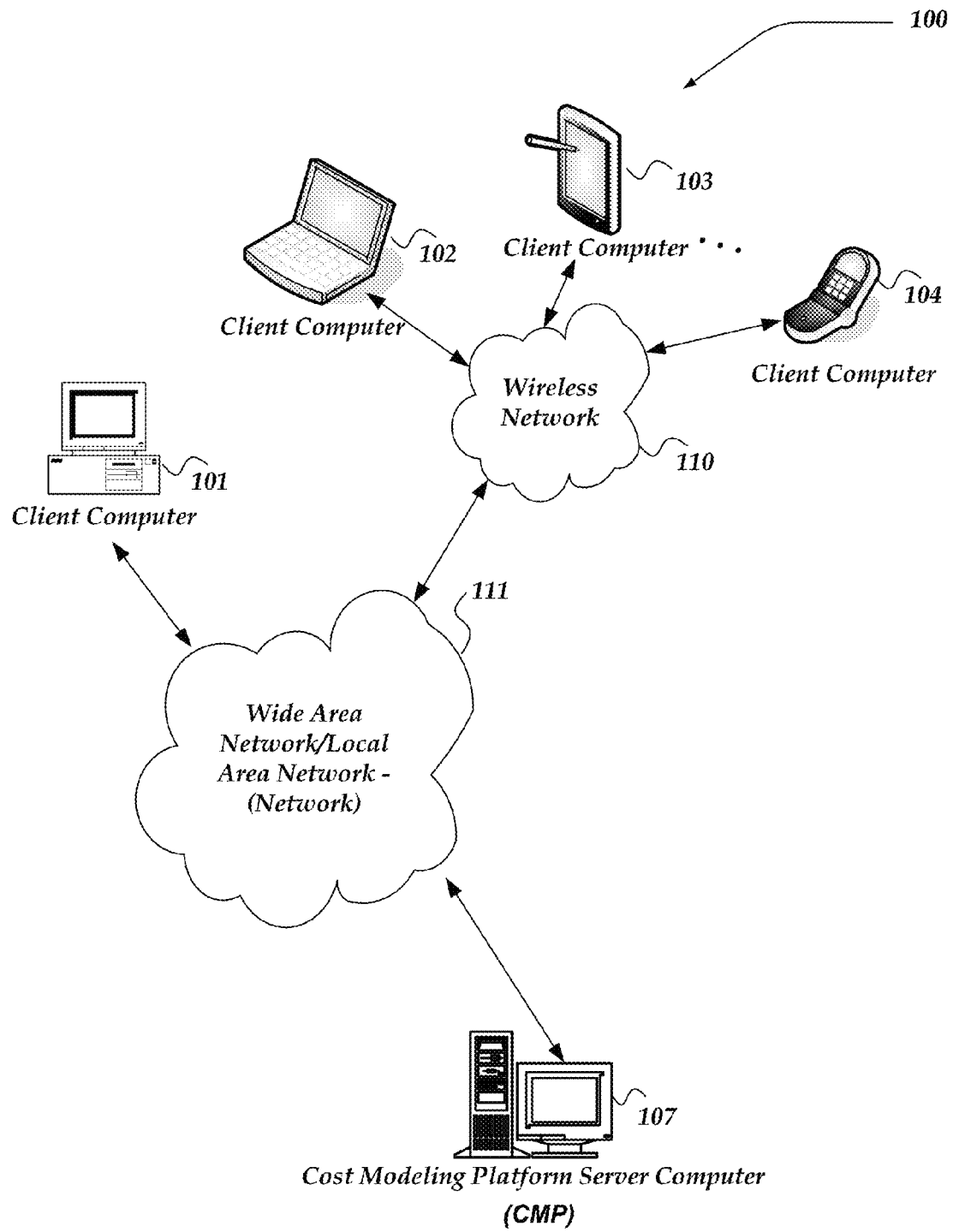
FIG. 1 illustrates a system diagram showing components of an environment in which at least one of the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "allocation model" refers to a model representation of a system of resource allocation rules that can be used for describing/modeling how resources are used within a system and/or entity. Nodes in the model may represent classes of items that may be associated with generating or consuming of resources. The edges of the graph may represent how the resources may be allocated between the nodes. An allocation model may include a visual rendering of a graph showing the nodes and the edges connecting the nodes.

As used herein, the term "financial allocation model," and "cost model" refers to a allocation model designed to represent a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may include a visual rendering of a graph showing the nodes and the edges connecting the nodes.

As used herein, the term "cost line item," refers to a single line item in a budget (or finance allocation model) and its associated cost/expense. For example, the costs associated with a particular computer that is an email server may be a single item having a particular cost (e.g., the email server may correspond to a cost line item).

As used herein, the term "category," refers to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category.

As used herein, the terms "allocation rules," "entity propagation rules," or "propagation rules" refer to rules in the financial allocation model that determine how the costs/expenses from a category are allocated between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category as well as the cost line item level.

As used herein, the term "assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein the term "allocation model item" refers to one or more items in an allocation model that may be allocated resources and/or that may allocate resources. An allocation model item may represent classes and/or categories of items in an allocation model. Accordingly, allocation model items may be considered the nodes in an allocation model that are connected by allocation rules for allocating the relevant resources. Allocation model items may be associated with an amount of allocated resources. Further, in an allocation model, allocation model items may be represent items that may consume or generate resources.

As used herein the term "visualization model" refers to a computer model organized to represent information from an underlying allocation model in a user-interface. A visualization model may present information from the allocation model in a summarized and/or interactive format that may be optimized for the role of the user. Also, a visualization model may be arranged to display the allocation model information in one or more types of displays and/or user-interfaces.

As used herein the term "visualization model item" refers to a displayable item in a visualization model. One or more allocation model items from the underlying allocation model may be mapped to a visualization model item. Visualization model items may be arranged to represent one or more category types, cost items, or the like. A visualization model item may represent the aggregated resource value/amount for the one or more allocation model items that are mapped to it.

As used herein the term "source visualization model item" refers to a visualization model item that is arranged to provide and/or allocate resources to another visualization model item (a target visualization model item). One or more of the allocation model items associated with the source visualization model item may be arranged to provide and/or allocation resources to other allocation model item in the underlying allocation model. For example, a source visualization model item may be arranged to allocate resources to one or more target visualization model items.

As used herein the term "target visualization model item" refers to a visualization model item that is arranged to receive and/or be allocated resources from one or more visualization model items. One or more of the allocation model items associated with the target visualization model item may be arranged to receive and/or be allocated resources from other allocation model items in the underlying allocation model. For example, a source visualization model item may be arranged to allocate resources to one or more target visualization model items.

As used herein the term "selected visualization model item" refers to one or more visualization model items in a visualization model that have been selected (either by a user or automatically). In some embodiments, the user-interface representing a selected visualization model item may be emphasized (e.g., highlighted) to indicate that the visualization model item is selected.

As used herein the terms "flow line," and "resource flow line" refer to representation of resource allocations between visualization model items. The flow lines represent allocations of resources associated with one or more of the allocation model items associated with a visualization model item. Each flow line may represent a set amount of resources being allocated from one or more source visualization model items to one or more target visualization model items. The kind of resource represented by a flow line will depend on the type of allocation model and/or visualization model. For example, if the allocation model is a financial allocation model, the allocated resources may be money, costs, expenses, or the like.

As used herein the term "input flow line" refers to flow lines that represent resources that are inbound to a selected visualization model item. Accordingly, an input flow line will start at a source visualization model item and end at the selected visualization model item.

As used herein the term "output flow line" refers to flow lines that represent resources that are outbound from a selected visualization model item. Accordingly, an output flow line will start at the selected visualization model item and end at a target visualization model item.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards visualizing the flow of resources in an allocation model. In at least one of the various embodiments, a computer visualization of an allocation model may be generated.

In at least one of the various embodiments, a visualization model may be selected based on an underlying allocation model. The visualization model may include one or more visualization model items. In at least one of the various embodiments, the visualization model items may be arranged into one or more tiers in the visualization model.

In at least one of the various embodiments, one or more allocation model items that are part of the allocation model may be mapped to the one or more visualization model items included in the visualization model. In at least one of the various embodiments, a resource value may be generated for each of the one or more visualization model items by at least aggregating an amount of resources corresponding to each of their one or more mapped allocation model items. In at least one of the various embodiments, the visualization model may be stored in the memory of a computer to at least preserve the mapping information and the resources values for the visualization model items.

In at least one of the various embodiments, if a visualization model item is selected for display, the visualization model may enable additional actions. In at least one of the various embodiments, the one or more source visualization model items that provide resources to the selected visualization model item may be determined. In at least one of the various embodiments, determining the one or more source visualization model items includes determining the one or more source visualization model items based on one or more source allocation model items that provide resources to one or more target allocation model items that correspond to the selected visualization model item.

Also, in at least one of the various embodiments, one or more target visualization model items that receive resources from the selected visualization model item may be determined. And, in at least one of the various embodiments, determining the one or more target visualization model items includes determining the one or more target visualization model items based on one or more target allocation model items that receive resources from one or more source allocation model items that correspond to the selected visualization model item.

In at least one of the various embodiments, input flow lines that start from the one or more source visualization model items and end at the selected visualization model item may be generated and displayed on the user-interface of a computer. And, in at least one of the various embodiments, output flow lines that start from the selected visualization model item and end at the one or more target visualization model items may be generated and displayed on the user-interface of the computer.

In at least one of the various embodiments, a display thickness at a beginning of a flow line may be determined based on a proportion of an amount of resources represented by the flow line and a total amount of resources associated with a source visualization model item. And, the display thickness at an end of the flow line may be determined based on a proportion of an amount of resources represented by the flow line and a total amount of resources associated with a target visualization model item.

In at least one of the various embodiments, a remainder of visualization model items that are not source visualization model items, target visualization model items, and the selected visualization model item may be determined. Accordingly, one or more user-interface controls that may correspond to the determined remainder of visualization model items may be dimmed or otherwise de-emphasized in the user-interface.

In at least one of the various embodiments, if a drill down action is performed on the selected visualization model item, one or more allocation details associated with the selected visualization model item may be determined and an interactive report that includes at least the one or more allocation details may be generated and/or displayed to a user.

Illustrated Operating Environment

FIG. 1 shows components of one embodiment of an environment in which at least one of the various embodiments may be practiced. Not all of components may be required to practice various embodiments, and variations in the arrangement and type of the components may be made. As shown, system 100 of FIG. 1 includes local area networks ("LANs")/wide area networks ("WANs")-(network) 111, wireless network 110, client computers 101-104, and Cost Modeling Platform (CMP) server computer 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, or the like. The client application may provide data representing assignment and/or allocation changes, selecting templates, editing cost allocations between or among categories, or the like. In at least one of the various embodiments, client applications may receive and/or generate data related to budgeting and financial models and may generate tables and relationships between and among the data. In at least one of the various embodiments, client computers 101-104 may view, visualize, and/or modify generated cost models. Also, in at least one of the various embodiments, client computers 101-104 may be arranged to display user-interfaces for interacting with one or more visualization models and/or reports.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, DPP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
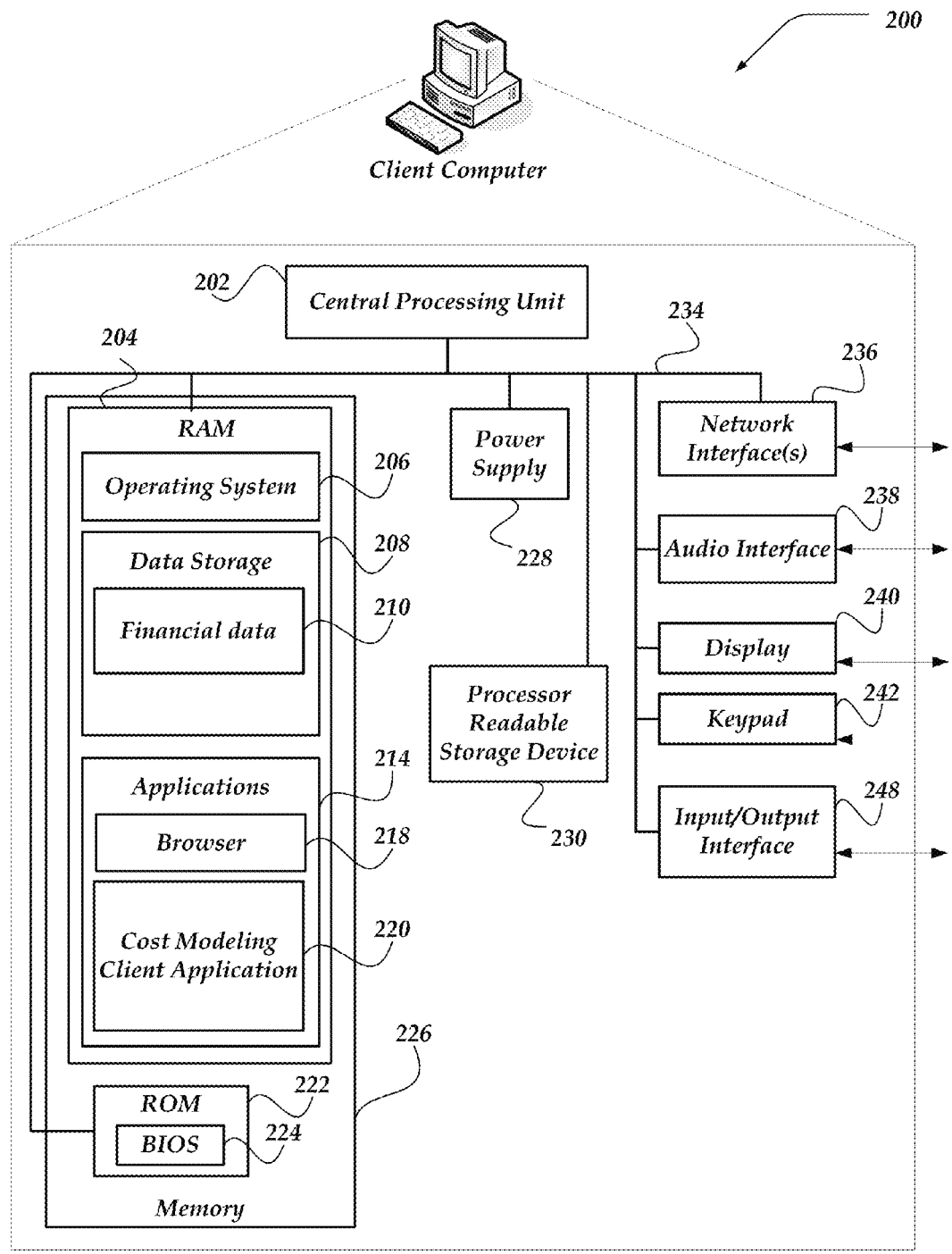
FIG. 2 shows one embodiment of a client computer that may be included in a system.

CMP 107 may include virtually any network computer usable to perform data processing operation that may be used for generating cost models, cost allocations, total cost values for offerings, displays and/or reports thereof, such as network computer 200 of FIG. 2. In at least one of the various embodiments, CMP 107 employs various techniques to create, define, generate, and/or automated data processing applications such as budgeting and financial management applications. CMP 107 may include modules for generating visualizations of one or more allocation models that may include dataset templates, category templates, allocation rules, or the like. Furthermore, CMP 107 may include and/or generate data processing applications for visualizing the generated allocation categories, cost allocations, budgets, cost models, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a plurality of network computers, within a cluster, a peer-to-peer architecture, and/or any of a variety of other architectures. Thus, CMP 107 is not to be construed as being limited to a single environment, and other configurations, and architectures are also envisaged. CMP 107 may employ processes and such as described below in conjunction with FIG. 4 and above to perform at least some of its actions.

Illustrative Client Computer

FIG. 2 shows one embodiment of client computer 200 that may be included in a system implementing at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 101-104 of FIG. 1.

As shown in the figure, client computer 200 includes a central processing unit ("CPU") 202 in communication with a mass memory 226 via a bus 234. Client computer 200 also includes a power supply 228, one or more network interfaces 236, an audio interface 238, a display 240, a keypad 242, and an input/output interface 248. Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computing device. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), LTE, HSDPA, user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 may be arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), organic LED, electronic ink, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another device based on a variety of events, including being sent as part of a header during a communication, sent upon request, or the like. At least a portion of the information may also be stored on a disk drive or other computer-readable storage device (not shown) within client computer 200. Further, as illustrated, data storage 208 may also financial data 210. In some embodiments, financial data 210 may include a database, text, spreadsheet, folder, file, or the like, that may be configured to maintain and store various budget data, propagation rules, audit logs, dataset templates, category templates, datasets, or the like. Such financial data 210 may also be stored within any of a variety of other non-transitory computer-readable storage devices, including, but not limited to a hard drive, a portable storage device, thumb drive, optical drive, solid state drive (SSD), or the like, such as illustrated by non-transitory computer-readable storage device 230. In yet other embodiments, data storage 208 may also store data associated with cost models that may be generated in part by CMP 107.

Applications 214 may include computer executable instructions which, when executed by client computer 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and cost modeling client application 220.

Browser 218 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client computer 200 to communicate with another network computer, such as CMP 107 of FIG. 1. In one embodiment, browser 218 may enable a user to view and/or manipulate generated cost models, budget projects, including creating budgets, modifying cost models, or the like. Further, in at least one of the various embodiments, browser 218 may be used to display user-interfaces for interacting with one or more visualization models.

In at least one of the various embodiments, a user may employ client computer 200 to manage budgeting and finance applications, and to access information stored or otherwise managed through CMP 107. Also, in at least one of the various embodiments, the user may be enabled to perform a variety of actions on the data, including, queries, comparisons, summations, analysis, or the like. Additionally, in at least one of the various embodiments, a user may employ client 200 to automate one or more processes that may be used for generating visualizations, resource allocation models, budget projects, or the like. In at least one of the various embodiments, cost modeling client application 220 may be arranged to enable a user to generate one or more visualizations of allocation models that include allocations rules, cost values, cost models, or the like. In at least one of the various embodiments, application 220 may be arranged to generate and render visualizations and display reports related to the resource allocation.

In any event, cost modeling client application 220 may employ processes similar to those described below and illustrated in FIG. 4 and above to perform at least some of its actions.

Illustrative Network Computer

Figure 3:
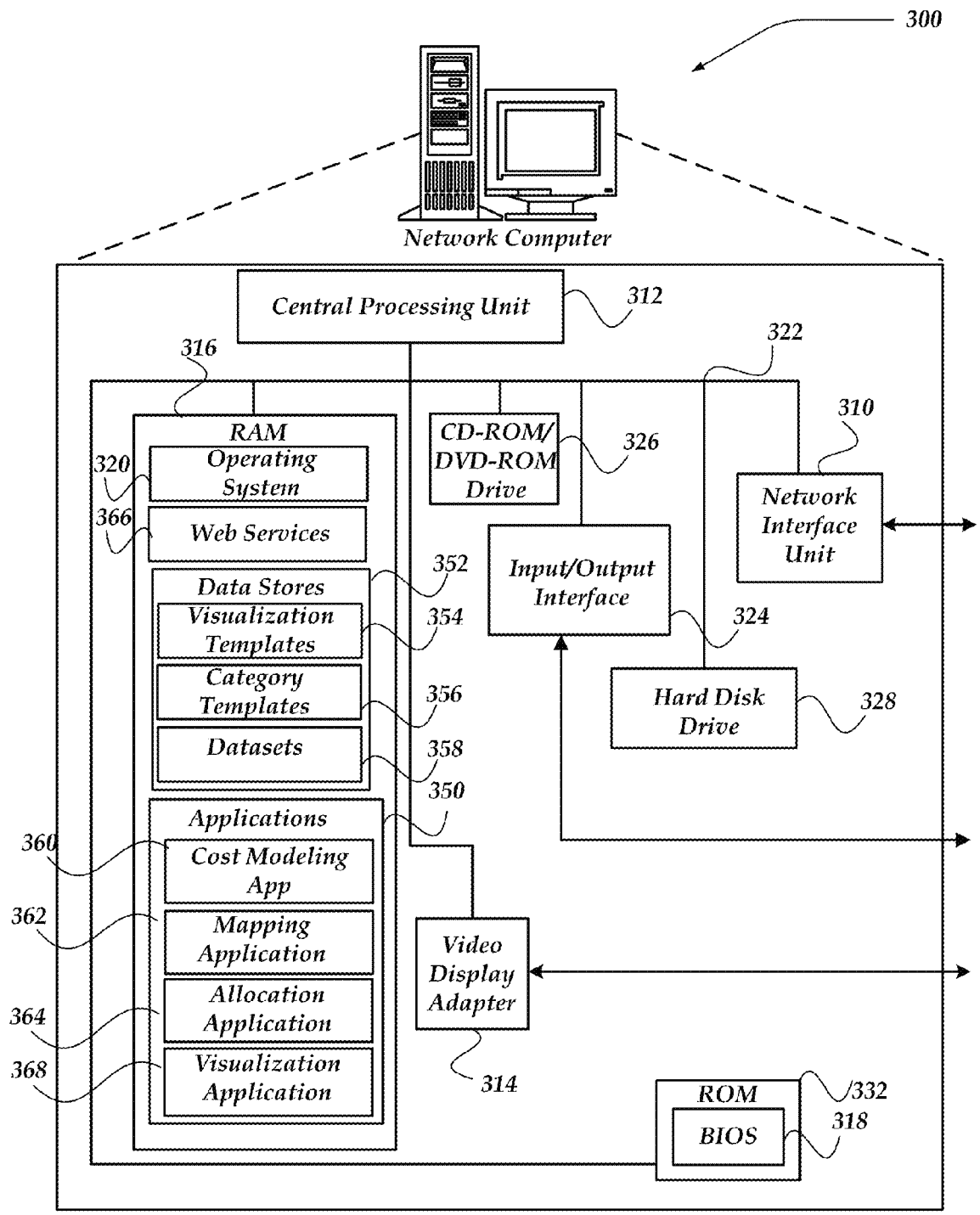
FIG. 3 illustrates one embodiment of a network computer that may be included in a system.

FIG. 3 shows one embodiment of network computer 300 that may be included in a system implementing at least one of the various embodiments. Network computer 300 may include many more or less components than those shown. The components shown, however, are sufficient to disclose an illustrative embodiment for practicing the invention. Network computer 300 may represent, for example, CMP 107 of FIG. 1.

Network computer 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive that may be coupled to a processor such as CPU 312. The mass memory stores operating system 320 for controlling the operation of network computer 300. Any general-purpose operating system may be employed. Basic input/output system ("BIOS") 318 is also provided for controlling the low-level operation of network computer 300. As illustrated in FIG. 3, network computer 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network computer 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor-readable storage media (devices) may include non-transitory, volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computing device.

As shown, data stores 352 may include a database, text, spreadsheet, folder, file, or the like, that may be configured to maintain and store various cost models, budget data, audit logs, device data, such as, dataset templates 354, category templates 356, datasets 358, or the like. In at least one of the various embodiments, data stores 352 may further include program code, data, algorithms, or the like, for use by a processor, such as central processing unit (CPU) 312 to execute and perform actions. In at least one of the various embodiments, at least some of data and/or instructions stored in data stores 352 might also be stored on another device of network computer 300, including, but not limited to cd-rom/dvd-rom 326, hard disk drive 328, or other computer-readable storage device resident on network computer 300 or accessible by network computer 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include dataset templates 354, web services 366, category templates 356, datasets 358, cost modeling application 360, mapping application 362, allocation application 364, visualization application 368, or the like.

Web services 366 represent any of a variety of services that may be configured to provide content, over a network to another computing device. Thus, web services 366 include for example, a web server, a File Transfer Protocol (FTP) server, a database server, a content server, or the like.

Web services 366 may provide the content over the network using any of a variety of formats, including, but not limited to WAP, HDML, WML, SGML, HTML, XML, compact HTML (cHTML), extensible (xHTML), or the like.

In at least one of the various embodiments, cost modeling application 360 may enable a user to generate budgets, cost models, total cost values for offerings, reports, or the like. In at least one of the various embodiments, mapping application 362 may enable automating of processes associated with the mapping datasets, such as, datasets 358, into visualization templates 354 and/or category templates 356.

In at least one of the various embodiments, visualization application 368 may be arranged to generate interactive computer visualizations that are based on an allocation model. In at least one of the various embodiments, visualization application 368 may comprises one or more visualization elements that are comprised of one or more allocation model resource items. In at least one of the various embodiments, one or more items of the allocation model may be mapped to elements of the visualization.

Moreover, cost modeling application 360, mapping application 362, allocation application 364, visualization application 368, or the like, may employ processes, or parts of processes, similar to those described below and shown in FIGURE's 4 and above to perform at least some of its actions.

Additionally, in one or more embodiments (not shown in the figures), the network computer may include an embedded logic hardware device instead of a CPU, such as, an Application Specific Integrated Circuit (ASIC), Field Programmable Gate Array (FPGA), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

FIGS. 4-7 are presented to illustrate at least one of the various embodiments for visualizing the flow of resources in an allocation model. In these examples, portions of a financial allocation model are used an example. However, in at least one of the various embodiments, allocation models for other types of resources may be implemented.

Figure 4:
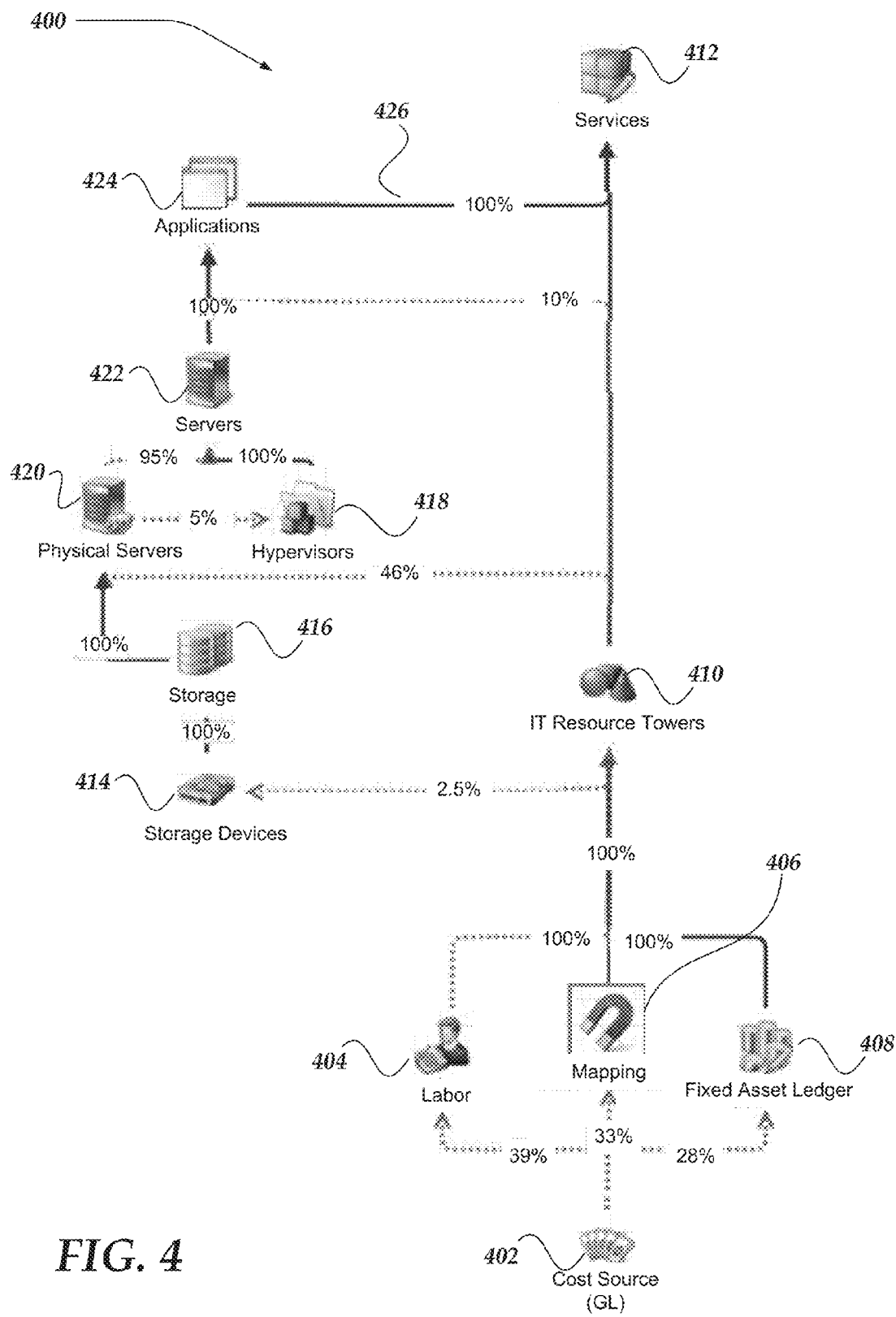
FIG. 4 shows one embodiment of a model for automatically generated business system.

FIG. 4 shows, for at least one of the various embodiments, allocation model 400 that may have been generated using cost modeling platform 107. In at least one of the various embodiments, in this example, allocation model 400 represents a business system that starts with costs flowing from cost source 402, which may be a general ledger (GL) or other type of financial data. In this allocation model, cost source 402 flows to labor 404, fixed asset 408, and to category mapping 406.

In at least one of the various embodiments, in allocation model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being model.

In at least one of the various embodiments, allocation model 400 shows that 100% of costs flow to IT resource tower 410. From IT resource tower 410 costs flow to services 412.

Thus, for this business system, allocation model 400 shows that all the costs are allocated to the service offerings that the modeled business organization provides.

In at least one of the various embodiments, the cost modeling application may further enable users to gain additional understanding of how the costs from cost source 402 flow through the entire system. Allocation model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, allocation model 400 shows that physical servers 420 are burdened by 100% of the costs of storage 416. And, since the business organization modeled by allocation model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

Figure 5:
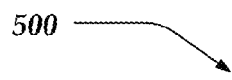
FIG. 5 illustrates a table that may include dataset information used in an allocation model in accordance with at least one of the various embodiments.

FIG. 5 shows table 500 that may include information related to datasets that may be used by cost modeling platform server computer 107 for generating allocation models for business systems. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided using one or more formats, such as, XML files, comma separated files, results pulled directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to cost modeling platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
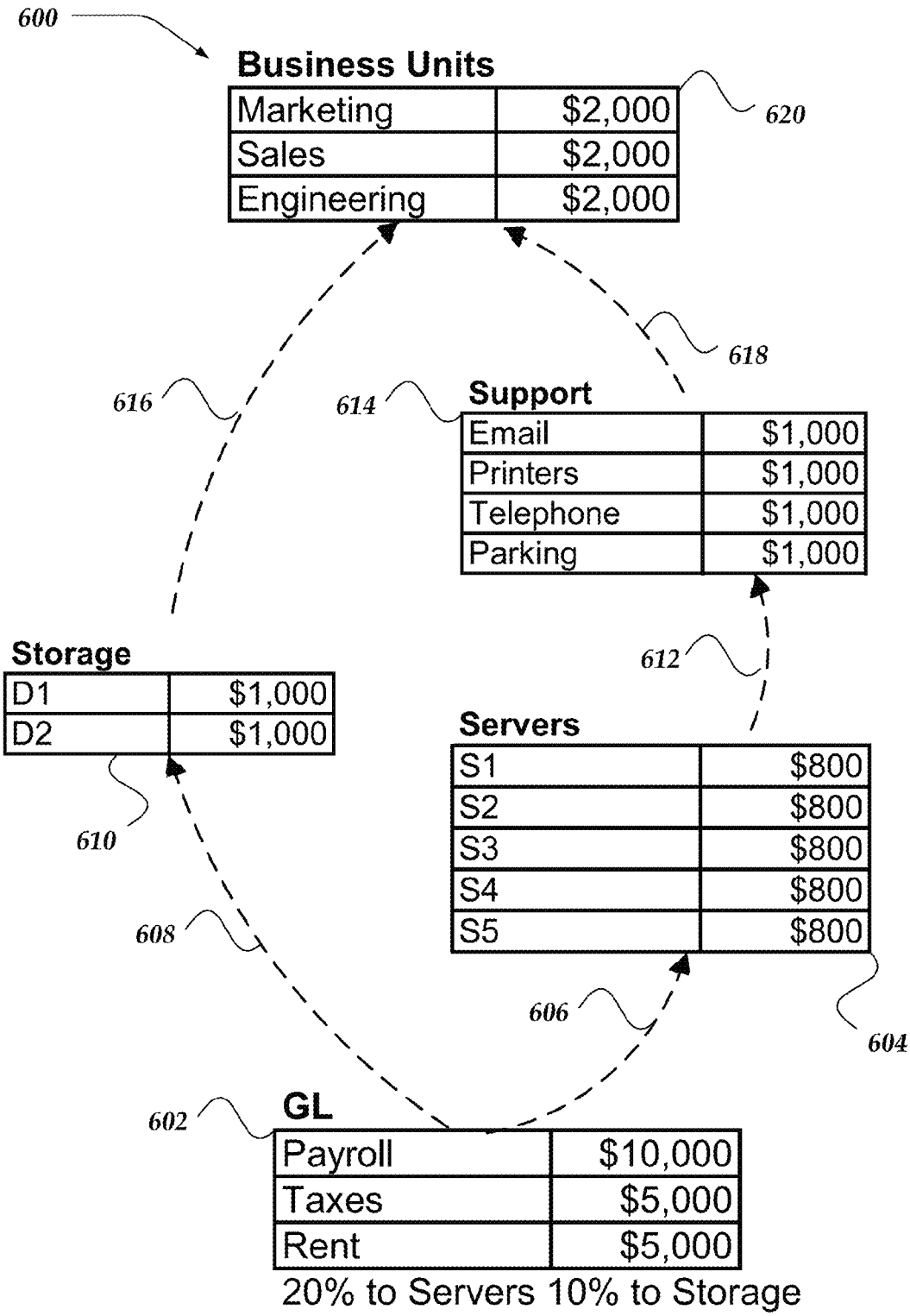
FIG. 6 shows a logical architecture of a model for an allocation model in accordance with at least one of the various embodiments.

FIG. 6 illustrates a logical architecture for allocation model 600 that may be used to support additional descriptions of the systems and methods enabled by at least one of the various embodiments. In at least one of the various embodiments, allocation model 600 may have five categories or allocation model items: GL 602, Servers 604, Storage 610, Support 612, and Business Units 616. In at least one of the various embodiments, each category/item may contain a set of cost line items. For example, GL 602 includes cost line items for Payroll, Taxes and Rent. Likewise, Support 612 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may be used to connect categories and/or allocation model items of allocation model 600. In at least one of the various embodiments, allocation rules may show how resources such as costs (money) flow between the allocation model items. Resulting in a graph where the items may be represented as nodes/vertices and the allocation rules may be represented as edges. In at least one of the various embodiments, generally an allocation model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 to Servers category 604. In this example, GL 602 includes a total of $20,000, thus 20% of $20,000 (e.g., $4,000) flows to Servers 606. Likewise, allocation rule 608 may allocate $2,000 from GL 602 to Storage 610. The other allocation rules in model 600 allocate 100% of the money to the next category: allocation rule 610 directs 100% of the money (e.g., $4,000) to flow to Support 612; allocation rule 616 directs 100% of the money in Support (e.g., $4,000) to flow to Business Units 616; and allocation rule 614 directs 100% of the money from Storage 610 to flow to Business Units 618.

In at least one of the various embodiments, money that flows into the category may be allocated among the included cost line items. In at least one of the various embodiments, each category may have one or more rules that may describe the assignment ratios for how the money in a category may be assigned to cost line items. For the categories 604, 610, 612, and 618, simple rules assign the money in the category evenly among the cost line items.

In at least one of the various embodiments, an assignment ratio may represent how the money in an actual budget may be assigned to the actual cost line items. In at least one of the various embodiments, rules may be applied that distribute the money based on formulas that may be defined by the users or administrators who designed the model. In at least one of the various embodiments, the assignment ratios and allocations may be modified as part of the modeling process.

The allocation model 600 is a simplified model useful for facilitating discussion and understanding of the embodiments, since allocation rules for models of large commercial entities can be numerous and complex. However, allocation model 600 is at least sufficient to enable one of ordinary skill in the art to practice what is claimed herein.

In at least one of the various embodiments, the allocation rules, allocation ratios, category assignments, cost items assignments, may be determined automatically based on a selected category template. In at least one of the various embodiments, mapping application 362 may employ category templates, such as category templates 356 to determine how values from dataset may be placed in the model.

Figure 7:
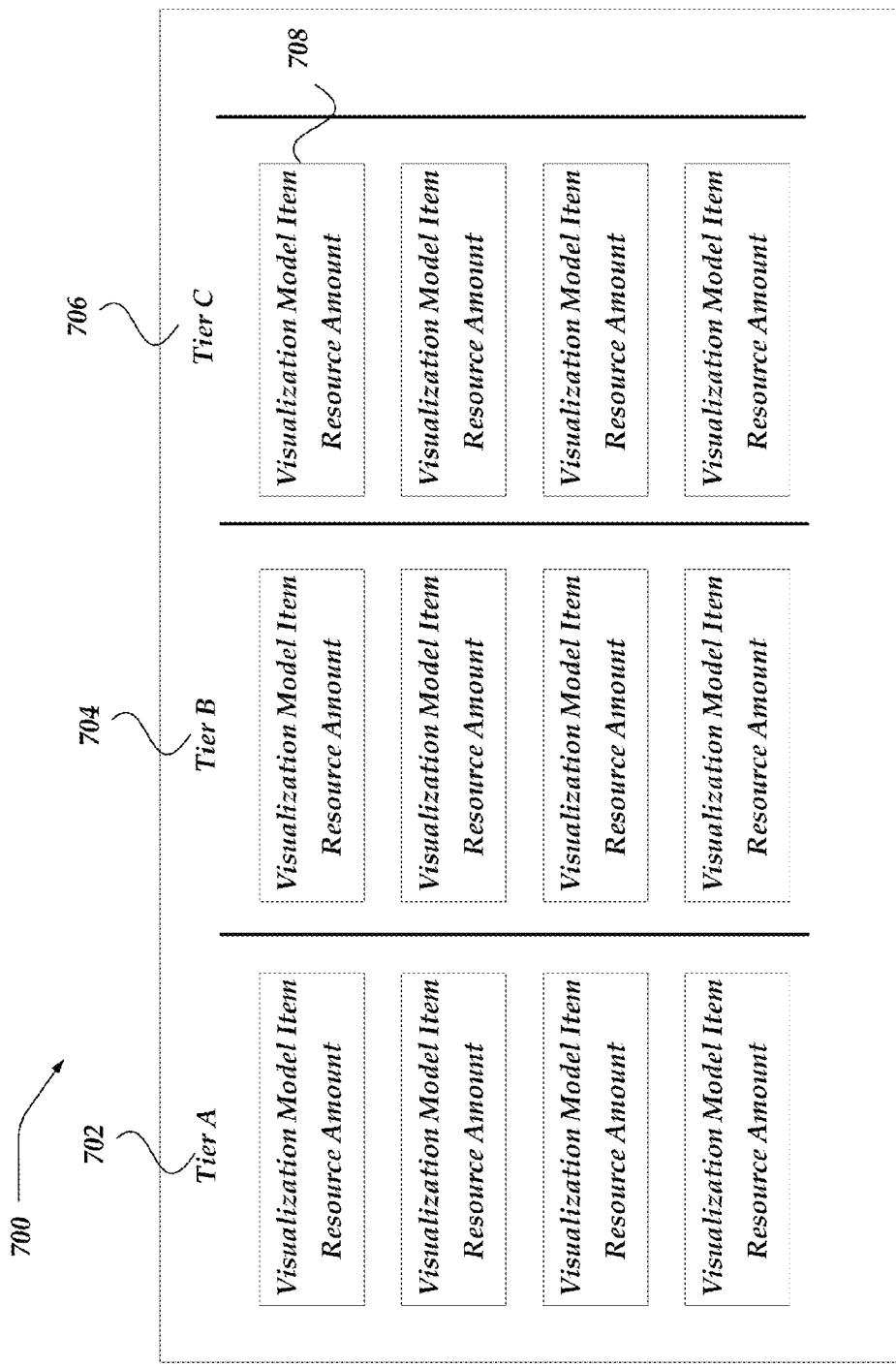
FIG. 7 illustrates a logical representation of a visualization model to visualize an allocation model in accordance with at least one the various embodiments.

FIG. 7 illustrates a logical representation of visualization model 700 to visualize an allocation model in accordance with at least one the various embodiments. In at least one of the various embodiments, resource allocation models may become increasingly complex as more items are added to model. For example, a financial allocation model for large enterprises may require thousands of allocation items with many complex allocation rules.

In at least one of the various embodiments, as the allocation models become larger and more complex it may become difficult for users to obtain a general understanding of the resources that may be allocated throughout the system. In some embodiments, an allocation model may be so complex that a user would need a detailed understanding of the design and operation of the model to glean useful information from it.

Accordingly, in at least one of the various embodiments, CMP 107 may be arranged to generate a visualization model, such as visualization model 700 to provide an interactive summarization of an underlying allocation model. In at least one of the various embodiments, visualization model 700 may be overlaid on an allocation model. In at least one of the various embodiments, some or all of the allocation model items comprising the allocation model may be mapped to visualization model items, such as, visualization model item 708.

In at least one of the various embodiments, visualization model items may be comprised of resource information that corresponds to one or more allocation model items. In some embodiments, resource allocation information for one or more classes, types, or categories, of allocation model items may be aggregated into a single visualization model item. For example, in at least one of the various embodiments, a visualization model item called Telecom may aggregate one or more telecom related allocation model items into a single visualization model item.

In at least one of the various embodiments, each visualization model item, such as, visualization model item 708 may be displayed in a user-interface that shows the name of the of the visualization model item and the amount of resources associated with the underlying allocation model items that comprise the visualization model item.

In at least one of the various embodiments, visualization models, such as, visualization model 700 may be arranged to comprise two or more tiers, such as, tier 702 (Tier A), tier 704 (Tier B), and tier 706 (Tier C), or the like. In some embodiments, the tiers may be named/labeled correspond with one or more portions of the underlying allocation model. In other embodiments, the tiers may be included in the visualization model to collect various items that may be related to each other. For example, in at least one of the various embodiments, if the underlying allocation model is a financial allocation model, the visualization model may include separate tiers for direct costs, services, business units, or the like, or combination thereof In at least one of the various embodiments, if the tiers in a visualization model correspond to the tiers of the underlying allocation model, the mapping of allocation model items to visualization model items may include mapping items to their like tiers. For example, if an allocation model includes a tier for business units, a visualization model for the allocation model may also include a tier for business units.

In at least one of the various embodiments, criteria for assigning model items to tiers may include their relative level in their respective model. In this context, model items at the same level and grouped into a tier may tend to allocate resources to other model items grouped into a different tier. Likewise, in at least one of the various embodiments, a model items in a tier may tend to be provided resources from a group of model item grouped into a different tier. For example, in at least one of the various embodiments, model items grouped into a service tier may tend to allocate resources to business unit items grouped into a business unit tier.

In at least one of the various embodiments, organizing the model items into tiers may enable the visualization model to represent the flow of resources in cleaner, less cluttered views. However, in at least one of the various embodiments, there is no strict requirement that model items in a given tier have to provide (or receive) resources from an adjacent tier, or any tier in particular. In at least one of the various embodiments, the organization of visualization model items into tiers that correspond to tiers in the underlying allocation model may facilitate the mapping of allocation model items to visualization model items, since the allocation model items associated with a given tier may be mapped to visualization model items associated with the corresponding visualization model tier.

Figure 8:
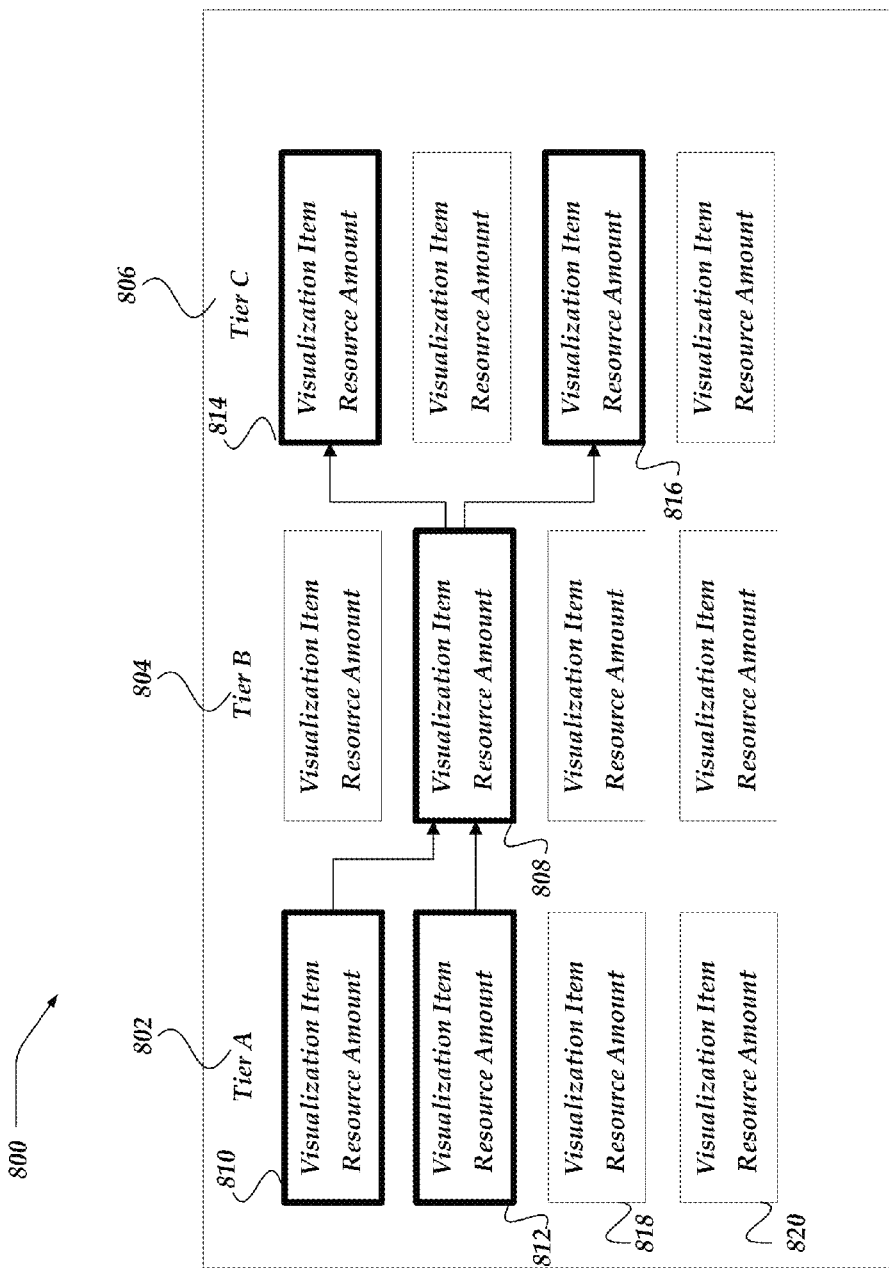
FIG. 8 illustrates a logical representation of a visualization model used analyze a portion of an allocation model in accordance with at least one the various embodiments.

FIG. 8 illustrates a logical representation of visualization model 800 used to analyze an allocation model in accordance with at least one the various embodiments. In at least one of the various embodiments, visualization model 800 includes tier 802 (Tier A), tier 804 (Tier B), and tier 806 (Tier C).

In at least one of the various embodiments, a visualization model may be used to visualize how resources are allocated by an underlying allocation model. In this example, visualization model item 808 obtains resources from visualization model item 810 and visualization model item 812. Likewise, visualization model 800 illustrates that visualization model item 808 provides (allocates) resources to visualization model item 814 and visualization model item 816.

In at least one of the various embodiments, other visualization model items represented in the model such as visualization model item 818 and visualization model item 820 (in this example) do not provide resources to model item 808, nor do they receive resources from model item 808. Accordingly, in this example, the directed lines that indicate resource flows are just associated with the visualization model items that are providing resources to visualization model item 808 and those that are receiving resources from visualization model item 808.

In at least one of the various embodiments, since the visualization model items may summarize and/or aggregate one or more allocation model items, the visualization model may provide a simplified and/or easier to understand view of how resources represented in an allocation model are being allocated. Likewise, in at least one of the various embodiments, by categorizing visualization model item into tiers, the flows of resources may be represented as flowing from one tier to another. Though in some cases, depending on the underlying allocation model, resources may not always flow to an adjacent tier. In some embodiments, resource flows may bypass one or more tiers in the visualization model. But the categorizing and/or classification of visualization model items into tiers may make it easier to understand how resources flow within the model.

In at least one of the various embodiments, user-interfaces that display visualization models may be interactive. Accordingly, in at least one of the various embodiments, if a user selects one or the visualization model items (VMIs), the user-interface may be arranged to highlight the selected VMI, the VMIs that provide resources to the selected VMI, and the VMIs that receive resources from the highlighted VMI. Also, in at least one of the various embodiments, the remaining VMIs may be dimmed.

Figure 9:
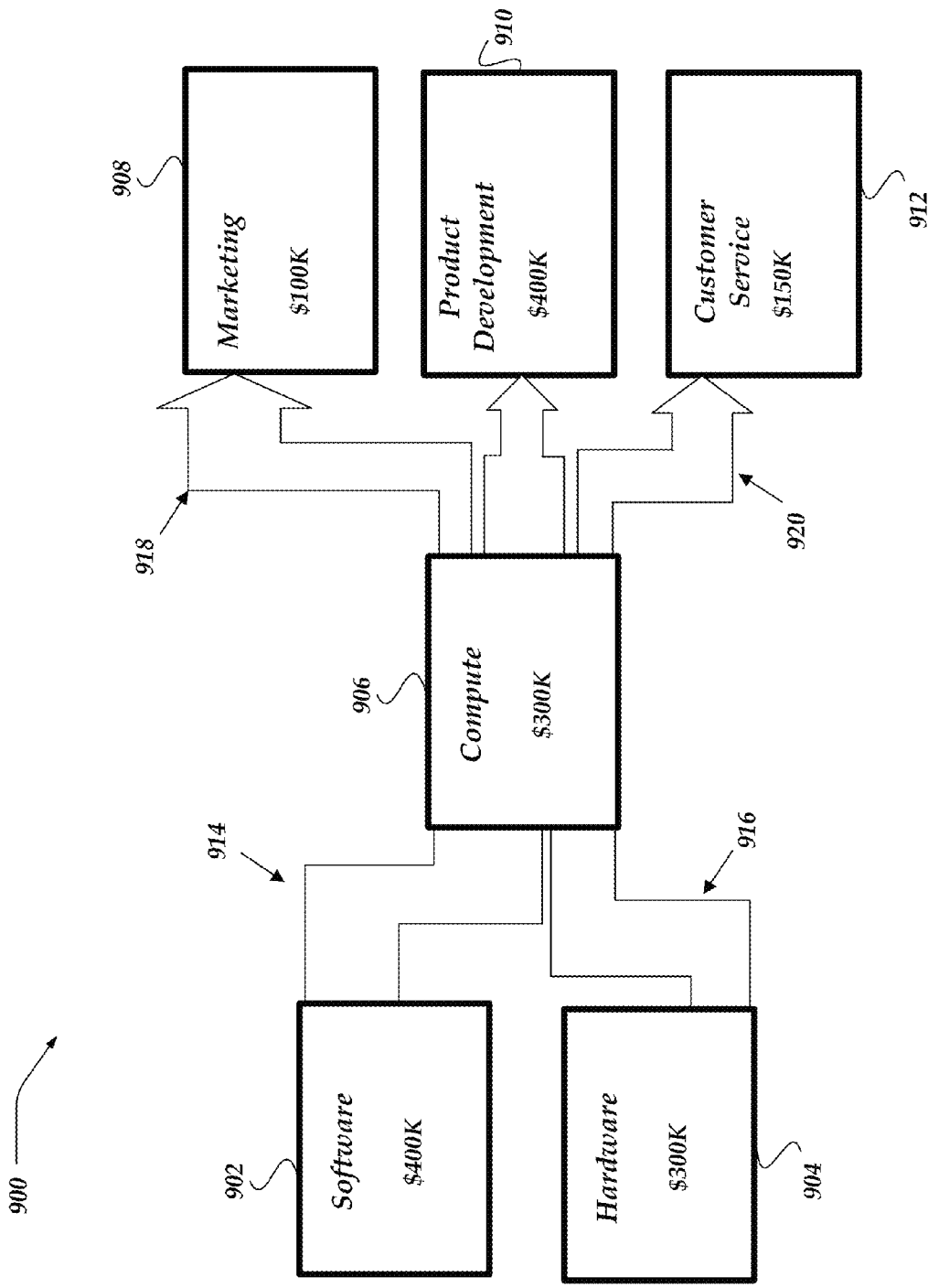
FIG. 9 illustrates a portion of a visualization model that shows the flow of resources for a visualization model item, in accordance with at least one of the various embodiments.

FIG. 9 illustrates a portion of visualization model 900 that shows the flow of resources for a visualization model item, in accordance with at least one of the various embodiments. In at least one of the various embodiments, as discussed above, a user may select one or more visualization model items (VMIs) to observe how resources flow in and out of the selected VMIs.

In this example, in at least one of the various embodiments, visualization model 900 includes five highlighted VMIs: software 902, hardware 904, compute 906, marketing 908, product development 910, and customer service 912. Each of these VMIs correspond to one or more underlying allocation model items. In this example, the user has selected compute 906 to show the flow of resources into and out of compute 906. In this example, the allocation model may be a financial allocation model so the resource being allocated in this example is money.

In this example, the money for compute services 906 is allocated from software 902 and hardware 904. Likewise, money and/or costs associated with compute services 906 are allocated to marketing 908, product development 910, and customer service 912.

In at least one of the various embodiments, visualization models may be arranged to represent the proportions of the resources being allocated using the size/width of the flow lines. For example, if the amount of resources flowing out of a VMI is 50% of the amount of the available resources, the width of the flow as it leaved the VMI should be rendered in the user-interface to appear be to half the height of the VMI. Likewise, for example, if the amount of resources flowing out of the VMI is 25% of the amount of resources allocated to the VMI, the flow line may be rendered to have a width that is 25% of the height of VMI as it is displayed in the user-interface. Further, in at least one of the various embodiments, the thickness of flow lines coming into a VMI may be rendered to be proportional to input of resources to the total resources allocated for the VMI.

In this example, visualization model 900 shows that compute 906 has been allocated $300K. It also shows that, funds from software 902 and hardware 904 contribute to the $300K. For this example, the thickness of flow line 916 flowing into compute 906 represent that one third of the money allocated to compute 906 is from hardware 904 and two-thirds of the money flowing into compute 906 through flow line 914. While the drawing is not necessarily to scale, for the purposes of this discussion, the thickness of flow line 916 as it reaches compute 906 should be considered to be one third the height of compute 906. And, for the purposes of this discussion, the thickness of flow line 914 as it reaches compute 906 should be considered to be two thirds the height of compute 906.

Further, as flow line 914 leaves software 902 its thickness is rendered to be half of the height of software 902 to represent that the outflow accounts for half of software 902's allocation of money ($200k). Likewise, in this example, the thickness of flow line 916 is rendered to be one third the height of hardware 904 to represent that the outflow of resources accounts for a third of the money allocated to hardware 904 ($100K).

On the outflow side of compute 906, visualization model 900 display flow lines representing the outflows from compute 906. In this example, the thickness of flow line 918 is rendered to be one fourth of the height of compute 906 to represent that its outflow accounts for one quarter of compute 906 resources ($50K). Also, in this example, the thickness of flow line 920 is rendered to be one fourth of the height of compute 906 to represent that its outflow accounts for one quarter of compute 906 resources ($50K). The thickness of the middle flow line flowing out of compute 906 is rendered to appear to have a thickness of one half the height of compute 906 to represent that the out flow accounts for half of the money associated with compute 906 ($200K).

Finally, in this example, for some embodiments, the inflow flow lines for marketing 908, product development 910 and customer service 912 are rendered to have a thickness proportional to the their total allocation. Accordingly, in at least one of the various embodiments, visualization model 900 provides a user-friendly visualization that enables a user to observe the flow of resources and their relative size/importance.

Generalized Operations

FIGS. 10-16 represent the generalized operation for visualizing the flow of resources in an allocation model in accordance with at least one of the various embodiments. In at least one of the various embodiments, processes 1000, 1100, 1200, 1300, 1400, 1500, and 1600 described in conjunction with FIGS. 10-16 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 10-16 may be operative in storage systems and/or architectures such as those described in conjunction with FIGS. 4-9.

Figure 10:
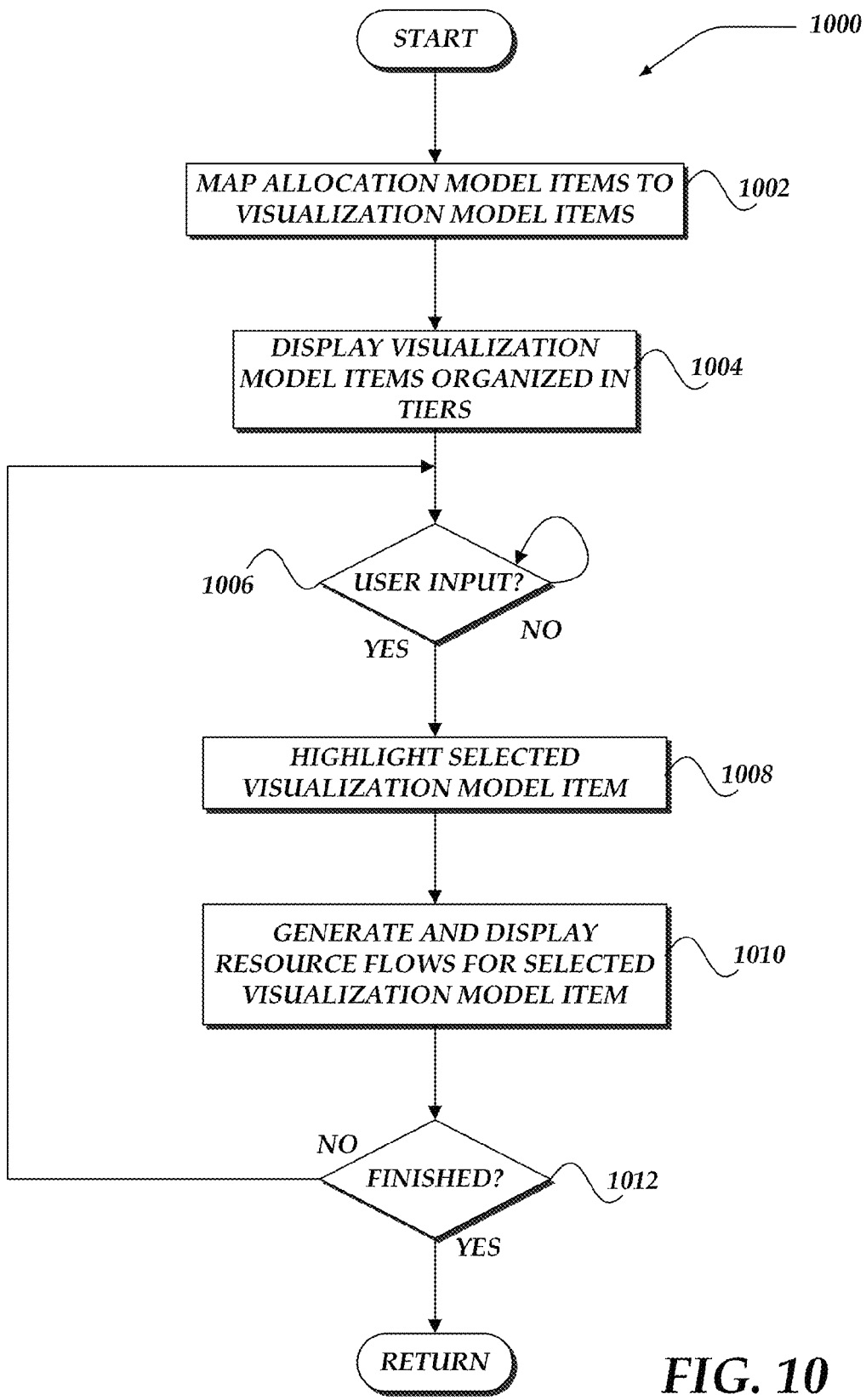
FIG. 10 shows an overview flowchart for a process that generates a visualization model in accordance with at least one of the various embodiments.

FIG. 10 shows an overview flowchart for process 1000 that generates a visualization model in accordance with at least one of the various embodiments. After a start block, at block 1002, in at least one of the various embodiments, one or more allocation model items may be mapped to visualization model items that are included in a visualization model. In at least one of the various embodiments, allocation models and/or visualization models may be associated with predefined templates that include mapping information for mapping some or all of the allocation model items to a visualization model items.

At block 1004, in at least one of the various embodiments, the visualization model items (VMIs) may be organized into tiers and displayed in a user-interface. In at least one of the various embodiments, the VMIs that comprise a visualization model may be organized into tiers. In some embodiments, the assignment to a tier may be defined in a template, or other source of configuration information. In at least one of the various embodiments, users may be enabled to manually assign VMIs to the one or more tiers. Also, in at least one of the various embodiments, users may be enabled to create one or more tiers and assign VMIs to those tiers. In at least one of the various embodiments, the visualization model may display the VMIs arranged into tiers.

At decision block 1006, in at least one of the various embodiments, if user input and/or interactions occur, control may flow to block 1008; otherwise, control may loop back to decision block 1006. In at least one of the various embodiments, user interaction may include one or more forms of user input, such as, mouse clicks, keyboard input, touchscreen touches, swipes, voice commands, or the like, or combination thereof.

At block 1008, in at least one of the various embodiments, one or more selected visualization model items may be highlighted in the user-interface. In response, to user input that selected a displayed/visible VMI, the selected VMI may be highlighted to indicate that it is the VMI that is under analysis. In at least one of the various embodiments, various user-interface methods may be employed to highlight the VMI, such as altering the color, changes to the border of the UI control, or the like, or combination thereof.

At block 1010, in at least one of the various embodiments, one or more resource flow lines may be generated for the selected visualization model item (VMI). As described above, resource flow lines may be generated to represent the source and amount of resources that may be allocated to the selected VMI. Likewise, in at least one of the various embodiments, resource flow lines may be generated to represent the destination and amount of resources that may be allocated to other VMIs from the selected VMI.

At decision block 1012, if the user is finished using the visualization model, control may be returned to a calling process; otherwise, control may loop back to decision block 1006.

Figure 11:
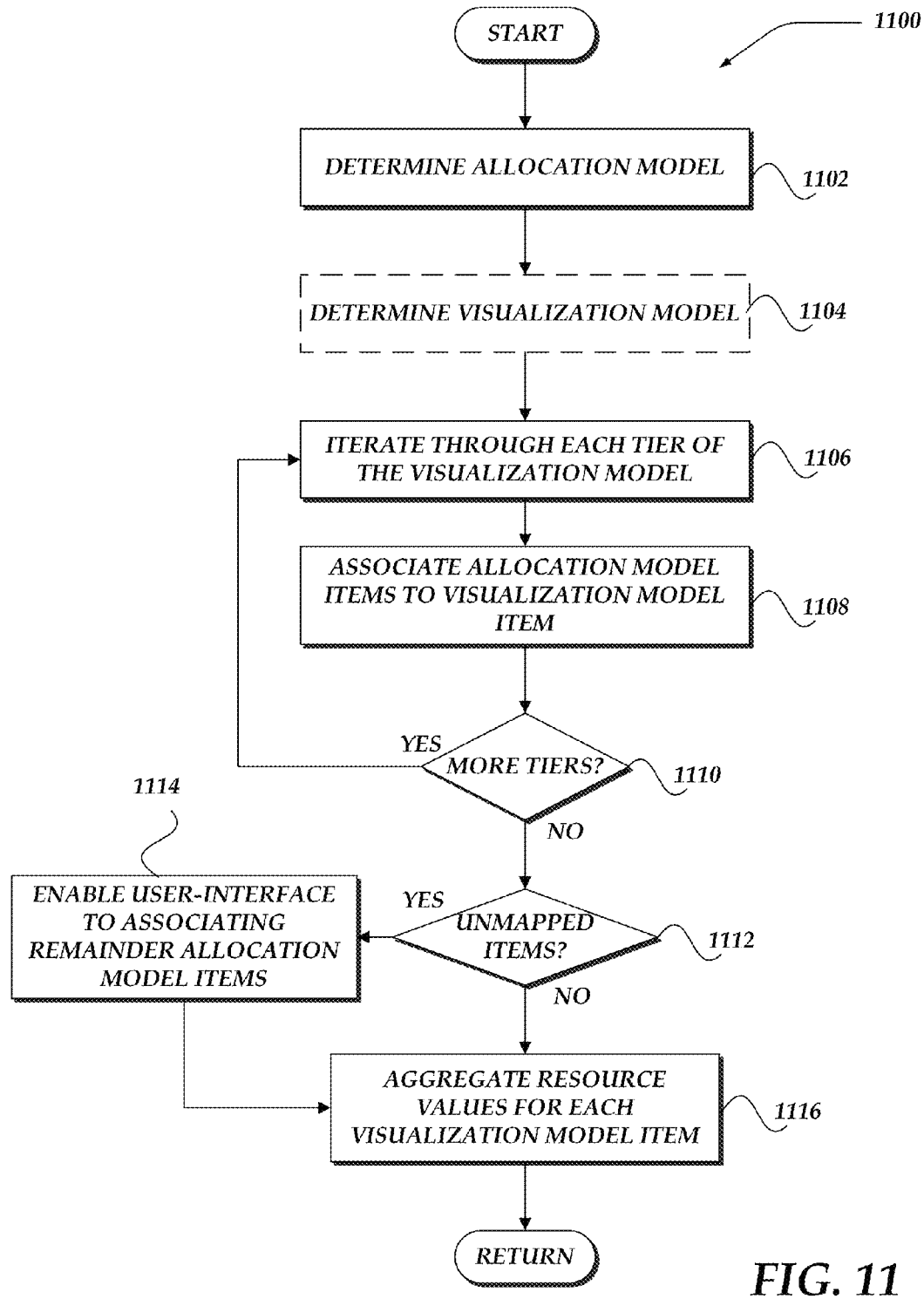
FIG. 11 shows an overview flowchart for a process that maps allocation model items to a visualization model in accordance with at least one of the various embodiments.

FIG. 11 shows an overview flowchart for process 1100 that maps allocation model items to a visualization model in accordance with at least one of the various embodiments. After a start block, at block 1102, in at least one of the various embodiments, a resource allocation model may be determined. In at least one of the various embodiments, users may select from among one or more resource allocation models. A listing of the available allocation models may be displayed in an interactive user-interface or defined by configuration information.

At block 1104, in at least one of the various embodiments, optionally, a user may determine a particular visualization model to use for visualizing the allocation model. In at least one of the various embodiments, the visualization model may be automatically determined by process 1100. In other embodiments, a user may be enabled to select a visualization model from a list or table showing the available visualization models. In at least one of the various embodiments, the visualization models made available to a user may be filtered or otherwise restricted based on the characteristics of the determined allocation model. For example, if a financial allocation model is being used, visualization models designed for different types of resources may be hidden from view of the user.

Also, in at least one of the various embodiments, a user's permission level, role, security access level, or the like, or combination thereof, may be employed to filter or restrict access to some or all of the visualization models.

At block 1106, in at least one of the various embodiments, process 1100 may iterate though each tier of the visualization model. In at least one of the various embodiments, the iteration order may be left-to-right, or first-to-last order, depending on user preference and/or configuration information. In other embodiments, more than one tier may be processed at the same time (in parallel).

At block 1108, in at least one of the various embodiments, one or more allocation model items associated with the allocation model may be mapped to a visualization model item. In at least one of the various embodiments, the visualization model items may be associated with (or included in) the current tier of the visualization model. In at least one of the various embodiments, configuration information associated with the visualization model may be employed to determine if an allocation model item maps to a particular visualization model item.

In at least one of the various embodiments, the allocation model items may include meta-data that may be employed to determine if items should be mapped to a particular visualization model item. In at least one of the various embodiments, meta-data may include references and/or tags that identify a tier in allocation model that the item may be associated with. Also, in at least one of the various embodiments, the meta-data may include information describing a type and/or category of the resource represented by the item. For example, an allocation model item may be tagged as labor, services, facilities, hardware, software, or the like, or combination thereof. Accordingly, the meta-data may be employed by a mapping application, such as, mapping application 362 to determine or recommend which visualization model item the allocation model item may be mapped to.

In some embodiments, allocation models may be arranged to organize their allocation model items using allocation model tiers. As discussed above, some or all of the allocation model tiers may correspond to one or more visualization model tiers. For example, the allocation model may have a business unit tier and in some cases a visualization model may also have a business unit tier Accordingly, the allocation model items in an allocation model tier that correspond to the current visualization model tier may be mapped to visualization model items in the current visualization model tier.

At decision block 1110, in at least one of the various embodiments, if there are more tiers in the visualization model to process, control may flow back block 1106; otherwise, control may flow decision block 1112.

At decision block 1112, in at least one of the various embodiments, if there are unmapped allocation model items, control may flow to block 1114; otherwise, control may flow to block 1116.

At block 1114, in at least one of the various embodiments, a user-interface may be generated to enable to the user to manually map the unmapped allocation model items to visualization model items. Also, in at least one of the various embodiments, the user-interface may enable the user to re-map allocation model items as needed. In some embodiments, process 1100 may be arranged to automatically map some or all of the remaining unmapped allocation model items to one or more visualization model items that may be designated for mapping to unmapped allocation model items. For example, in at least one of the various embodiments, a visualization model may be arranged to include a "catchall" and/or fallback visualization model item to assign unmapped allocation model items.

At block 1116, in at least one of the various embodiments, the resource values associated with each of the allocation model items that are mapped to the visualization model items may be aggregated into to single value. In at least one of the various embodiments, each individual allocation model item may have a resource value. In some embodiments, there may be multiple allocation model items mapped to a single visualization model item. In such cases, the total amount of resources allocated to each allocation model item may be summed for the visualization model item. Next, control may be returned to a calling process.

Figure 12:
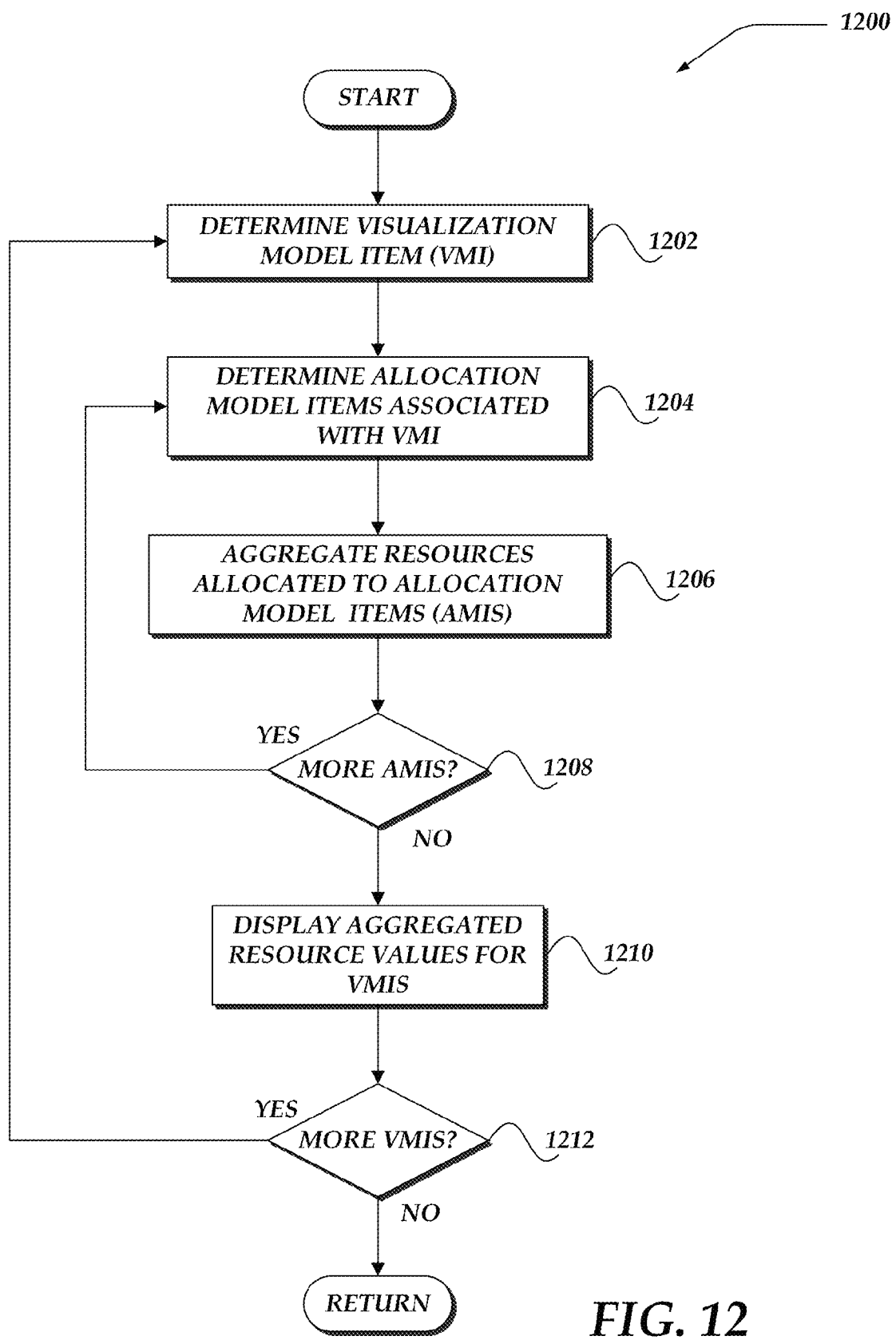
FIG. 12 shows an overview flowchart for a process that computes aggregated resource values for visualization model items in accordance with at least one of the various embodiments.

FIG. 12 shows an overview flowchart for process 1200 that computes aggregated resource values for visualization model items in accordance with at least one of the various embodiments. After a start block, at block 1202, in at least one of the various embodiments, determine a visualization model item (VMI) that is included in the visualization model.

At block 1204, in at least one of the various embodiments, the one or more allocation model items that may be associated with the determined VMI may be determined. At block 1206, in at least one of the various embodiments, aggregate the resources that are associated with the one or more allocation model items. At decision block 1208, in at least one of the various embodiments, if there are more allocation model items associated with the current VMI, control may loop back to block 1204; otherwise, control may flow to block 1210. At block 1210, in at least one of the various embodiments, the aggregated resources values may be shown in their corresponding VMIs in the user-interface that is displaying the visualization model. At decision block 1212, in at least one of the various embodiments, if there are more VMIs control may loop back to block 1202; otherwise, control may be returned to a calling process.

Figure 13:
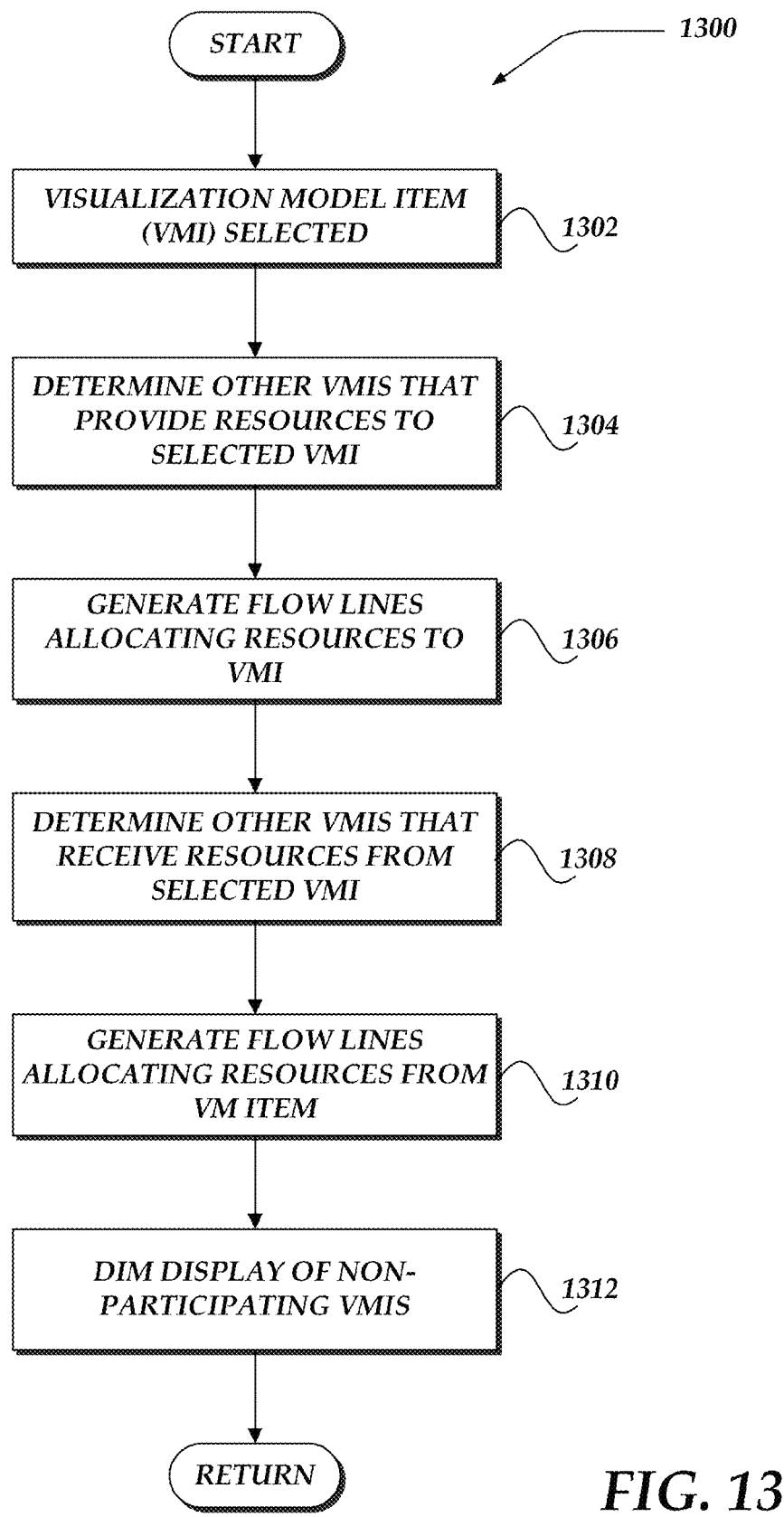
FIG. 13 shows an overview flowchart for a process for handling the selection of a visualization model item in a user-interface in accordance with at least one of the various embodiments.

FIG. 13 shows an overview flowchart for process 1300 for handling the selection of a visualization model item in a user-interface in accordance with at least one of the various embodiments. After a start block, at block 1302, in at least one of the various embodiments, one or more visualization model items (VMIs) may be selected by a user. In at least one of the various embodiments, one or more VMIs may be automatically selected based on configuration information (e.g., default selection settings).

At block 1304, in at least one of the various embodiments, one or more other VMIs that provide resources to the selected VMI may be determined. In at least one of the various embodiments, an application, such as, allocation application 364, visualization application 368, or the like, may be arranged to determine which VMIs provide resources to the selected VMI.

In at least one of the various embodiments, if the selected VMI is mapped to two or more allocation model items, resources flowing into each of these mapped allocation model items may be determined using the allocation model to determine the amount of resources to show flowing into the selected VMI.

In at least one of the various embodiments, the allocation model may be arranged into a graph or graph-like data structure, where the items are vertices and the flow of resources are represented by edges. Accordingly, one or more traversal methods may be employed to determine the allocation model items that are supplying resources to the allocation model items that are associated with the selected VMI. In at least one of the various embodiments, the VMIs that provided resources to the selected VMI may be determined from those allocation model items that are providing the resources.

In at least one of the various embodiments, the determination of the VMIs that provide resources to the selected VMI may be in real-time after the VMI is selected. Or, in at least one of the various embodiments, the tracing may be determined previously and cached.

At block 1306, in at least one of the various embodiments, one or more resource flow lines for resources that are allocated to the selected VMIs may be generated. In at least one of the various embodiments, flow lines may be rendered as coming from the source VMIs and going into the selected VMI. In at least one of the various embodiments, the flow lines may be rendered in different colors enabling them to be individually traced by observation. Further, the flow lines may be routed around intervening tiers in the visualization model display if the VMIs providing the resources are not in adjacent tier.

Also, in at least one of the various embodiments, the thickness of flow lines may be rendered to illustrate the relative proportion of the source VMI's resources that are represented by the outflow of resources.

At block 1308, in at least one of the various embodiments, one or more other VMIs that receive resources from the selected VMIs may be determined.

In at least one of the various embodiments, process 1300 may employ the allocation model to determine each allocation model item that may be allocated resources from one or more of the allocation model items that are associated with the selected VMI. As described in block 1304, process 1300 may traverse the allocation model to determine the allocation model items that receive resources from the allocation model items that are associated with the selected VMI. Accordingly, the process may determine the VMIs that receive resources from the selected VMI based on the allocation model items receiving outflows from the allocation model items associated with the selected VMI.

At block 1310, in at least one of the various embodiments, one or more resource flow lines for resources that flow from the selected VMI may be generated. Similar, to the actions performed in block 1306, the source flow lines coming from the selected VMIs may be rendered and displayed. However, in at least one of the various embodiments, the thickness of the flow lines as they meet a destination VMI may be rendered proportional to the amount of resources represented by the flow line and the total amount of resources allocated to the destination VMI.

At block 1312, in at least one of the various embodiments, the VMIs not associated with the selected VMIs may be dimmed in the user-interface. In at least one of the various embodiments, to emphasize the VMIs that are associated with the selected VMIs, other VMIs visible in the visualization model may be dimmed, or otherwise deemphasized. In at least one of the various embodiments, these other VMIs may be dimmed rather than hidden to provide observable context to the selected VMIs and the VMIs that are providing resources or receiving resources. Next, control may be provided to a calling process.

Figure 14:
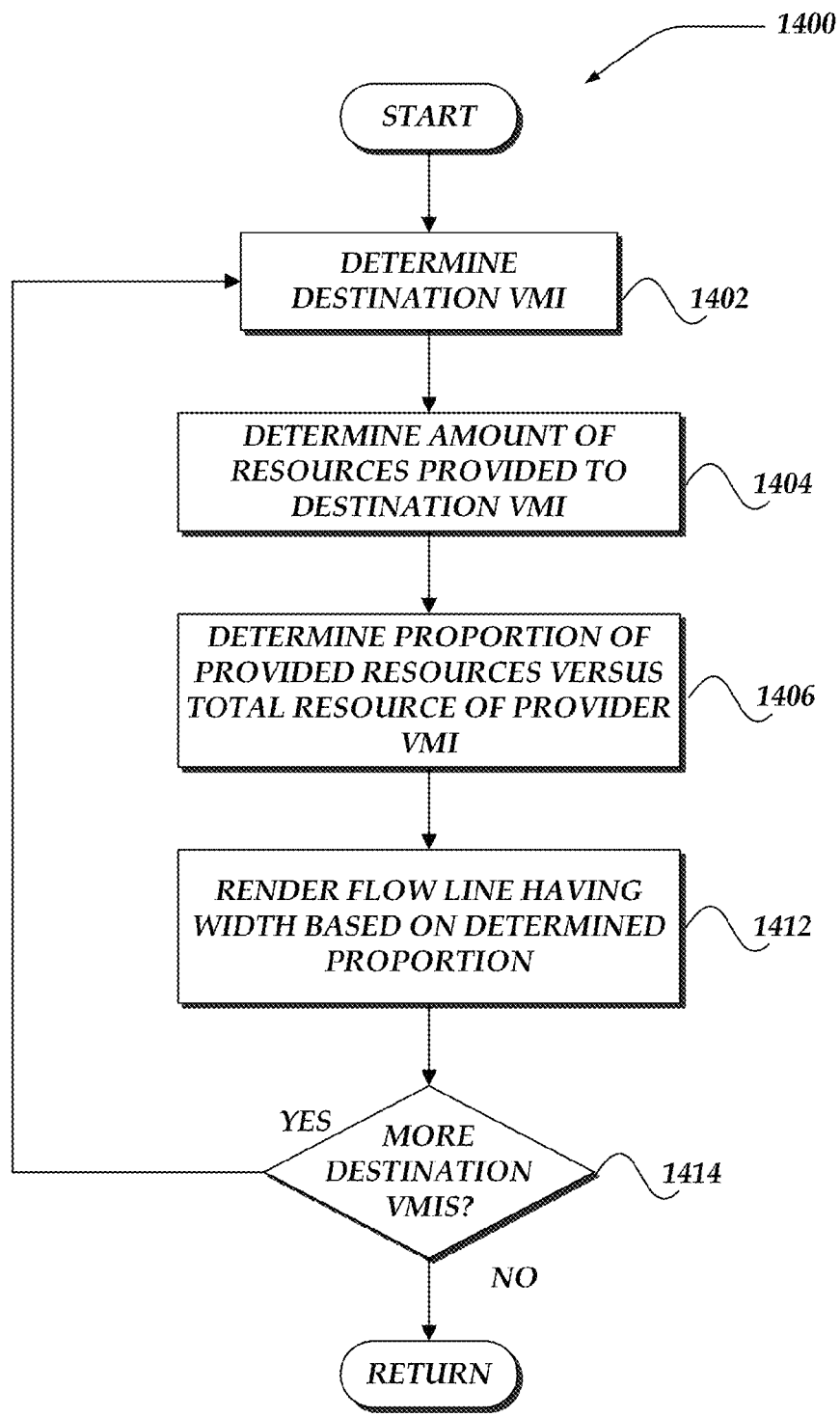
FIG. 14 shows an overview flowchart for a process that generates output resource flow lines for visualization model items in accordance with at least one of the various embodiments.

FIG. 14 shows an overview flowchart for process 1400 that generates output resource flow lines for visualization model items in accordance with at least one of the various embodiments. After a start block, at block 1402, in at least one of the various embodiments, determine a destination VMI that may be allocated the resources. In at least one of the various embodiments, the allocation model or the visualization model may be traversed to identify one or more VMIs that may be allocated resources from a particular VMI. In at least one of the various embodiments, a given VMI may allocate resources to one or more VMIs, depending on the arrangement of the underlying allocation model and the mapping of the allocation model items to the VMIs.

In at least one of the various embodiments, a VMI may be mapped to one allocation model item (AMI) that allocates resources to more than one other AMI. These AMIs may be mapped to the same or different VMIs. Also, in at least one of the various embodiments, a VMI may be mapped to multiple allocation model items with some or all of those AMIs providing resources to AMIs that are mapped to different VMIs. Accordingly, resources associated with a given VMI may flow to one or more VMIs.

In at least one of the various embodiments, if the resources in a VMI flow to more than one VMI, the visualization model may generate a separate outbound flow line for each target VMI.

At block 1404, in at least one of the various embodiments, the amount of resources provided to the destination VMI may be determined. In at least one of the various embodiments, the sum of the resources allocated by the underlying allocation model item may be used to determine the amount of resources represented by outbound flow line.

At block 1406, in at least one of the various embodiments, the proportion of the provided resources to the total allocated resources of the providing/source VMI may be determined. In at least one of the various embodiments, the total amount of resources allocated to the VMI that is the source of the outbound flow may be computed based on the resource allocation values of all of the allocation model items that are mapped to the VMI. For example, in a financial allocation model, a hardware VMI may be mapped to allocation model items such as servers, routers, switches, database server, or the like. In this example, the costs allocated to server, routers, switch, and database server may be summed to generate to the total resource allocation value for the hardware VMI that they are mapped to.

At block 1408, in at least one of the various embodiments, the outbound resource flow line may be rendered for display on a user-interface. In at least one of the various embodiments, the thickness/width of the resource flow line at the source VMI may be sized based on the proportion of the outflow of resources corresponding to the flow line to the total amount of resources represented by the source VMI. For example, in a financial allocation model, if the source VMI has a total of $100K and the outbound flow line represents $50K, the thickness of the outbound flow line at its source VMI may be rendered to have a thickness that may be half the height of the VMI as it is rendered in the user-interface. In some embodiments, each VMI in the user-interface may be rendered to have the same height, accordingly the thickness of the outbound flow lines may indicate by observation the relative quantity of resources it represents. In another example, if the outbound flow line represents all of the resources allocated to the source VMI, the thickness/width of the outbound flow line may be rendered to the be same height as the source VMI (as rendered in the UI).

At decision block 1410, in at least one of the various embodiments, if there are more destination VMIs, control may loop back to block 1402; otherwise, control may be returned to a calling process. In at least one of the various embodiments, if a source VMI is providing resources to a selected VMI, the selected VMIs may be the only destination VMIs. Alternatively, if the source VMI is the selected VMI, there may additional destination VMIs that need to be processed.

Figure 15:
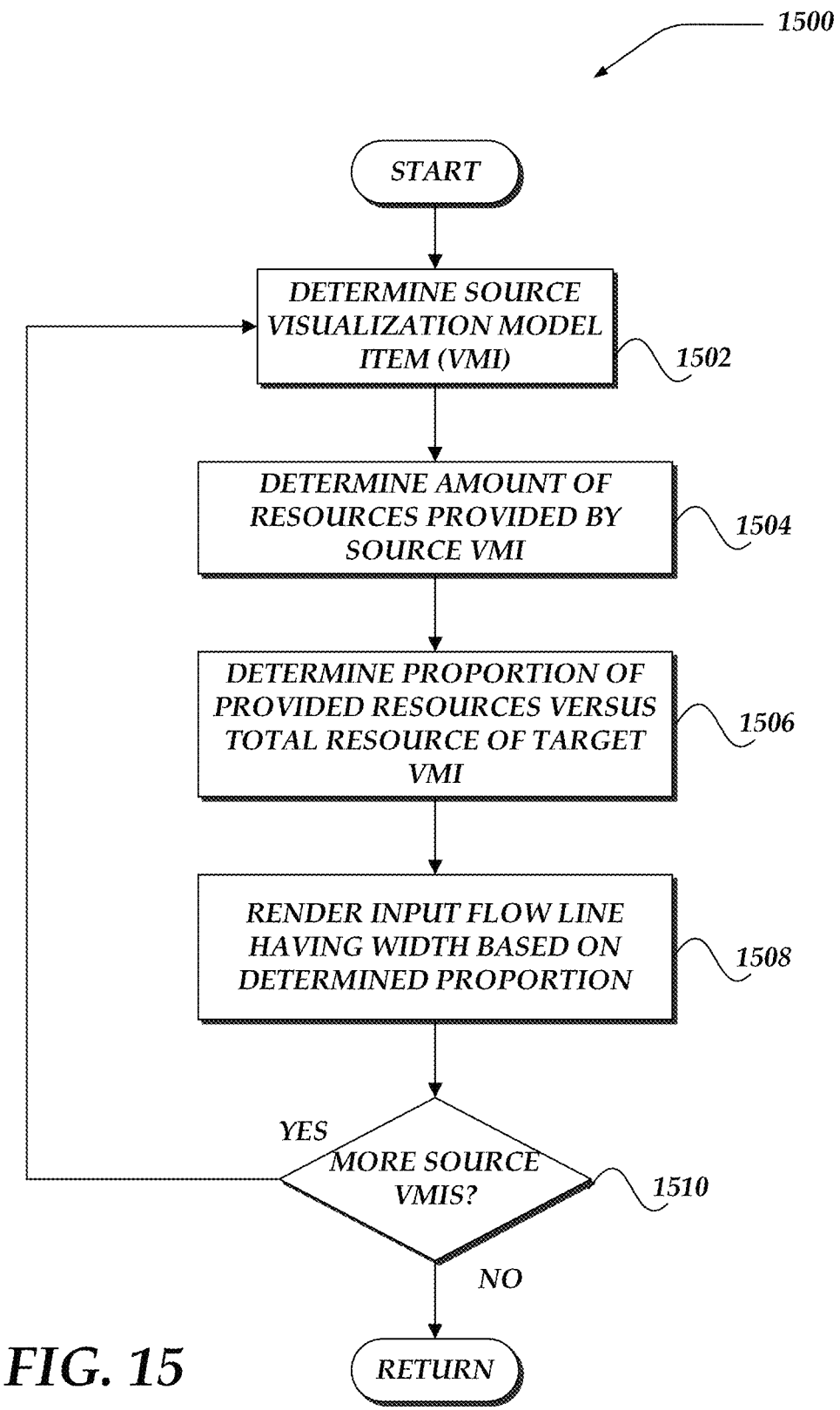
FIG. 15 shows an overview flowchart for a process that generates input resource flow lines for visualization model items in accordance with at least one of the various embodiments.

FIG. 15 shows an overview flowchart for process 1500 that generates input resource flow lines for visualization model items in accordance with at least one of the various embodiments. After a start block, at block 1502, in at least one of the various embodiments, a source VMI that may be allocating resources to the receiving VMI may be determined. Similar to determining destination VMIs described above, a source VMI that is providing resources to the VMI may be determined. Accordingly, the underlying allocation model may be traversed to determine the source allocation model items for the allocation model items that are associated with receiving VMI. From the source allocation model items, the source VMIs may be determined.

In at least one of the various embodiments, if the (target) VMI being processed was selected for analysis, there may be one or more source VMIs providing resources. Alternatively, if the source VMIs are the VMIs selected for analysis, the selected VMIs will be the only source VMIs.

At block 1504, in at least one of the various embodiments, the amount of resources provided by the source VMI may be determined. This may include portions of resources from the one or more underlying allocation model items that are associated with the source VMI.

At block 1506, in at least one of the various embodiments, the proportion of the provided resources versus the total resources of the target VMI may be determined. In at least one of the various embodiments, the total amount of resources allocated to the target VMI may be computed based on the allocation model items associated with the target VMI. In at least one of the various embodiments, the proportion may be determined by dividing the total resources allocation to the target VMI by the amount of resources allocated by the source VMI.

At block 1508, in at least one of the various embodiments, input resource flow lines may be rendered for display such that their width is determined based on the proportion of resources represented by the provided resources. In at least one of the various embodiments, the thickness/width of the resource flow line at the target VMI may be sized based on the proportion of the inflow of resources corresponding to the flow line to the total amount of resources allocation to the target VMI. For example, in a financial allocation model, if the target VMI has a total of $100K and the inbound flow line represents $50K, the thickness of the inbound flow line at the target VMI may be rendered to have a thickness that may be half the height of the target VMI as it is rendered in the user-interface. At destination block 1510, in at least one of the various embodiments, if there are more source VMIs, control may loop back to block 1502; otherwise, control may be returned to calling process.

Figure 16:
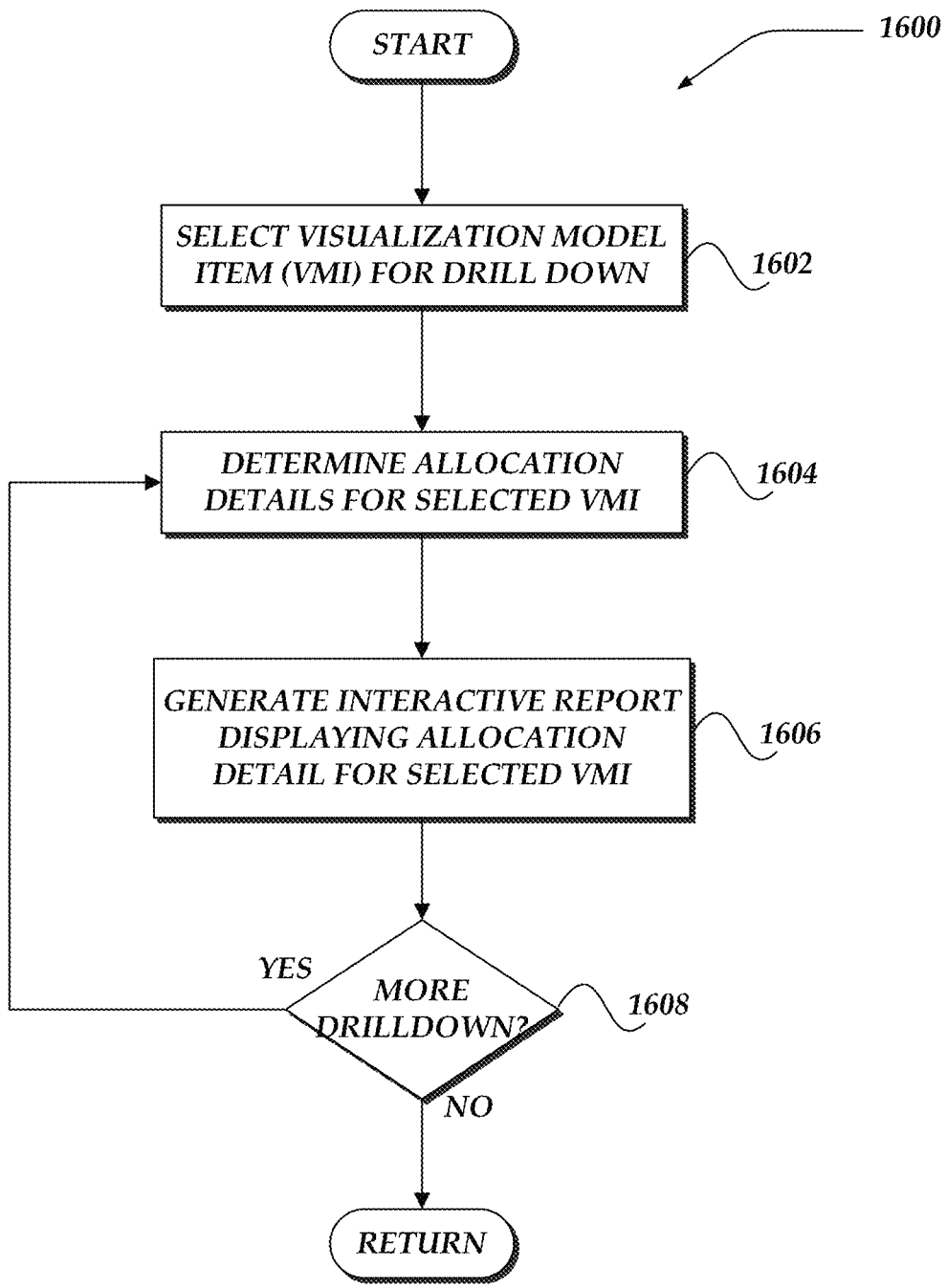
FIG. 16 shows an overview flowchart for a process that generates detail information displays for a visualization model in accordance with at least one of the various embodiments.

FIG. 16 shows an overview flowchart for process 1600 that generates detail information displays for a visualization model in accordance with at least one of the various embodiments. After a start block, at block 1602, in at least one of the various embodiments, a visualization model item (VMI) may be selected by a user. In at least one of the various embodiments, one or more VMIs may be automatically selected based on configuration information (e.g., default settings).

At block 1604, in at least one of the various embodiments, the allocation details for the selected VMI may be determined. In at least one of the various embodiments, detail information may be based on the underlying allocation model items that may be associated with the VMI. In some embodiments, a list and/or report may show one or more allocation model items that may be associated with the VMI.

In at least one of the various embodiments, the allocation model items associated with the VMI may be employed to determine additional detail information. In some embodiments, detail information may include allocation rule information, rollup percentages, rollup ratios, rollup values, or the like. In at least one of the various embodiments, detail information may display lists or tables, of the source information for the allocation model. For example, source information may include lists of servers, employees, software licenses, or the like, that may comprise the underlying allocation model.

At block 1606, in at least one of the various embodiments, an interactive report that includes some or all of the determined allocation details of the selected VMI may be generated and displayed in a user-interface. In at least one of the various embodiments, an interactive user-interface may be generated to show the detail information. In at least one of the various embodiments, the display may comprise one or more of, dialog boxes, popup windows, window panes, or the like, or combination thereof.

In at least one of the various embodiments, the report may be interactive in that a user may be enabled to drilldown into more detailed information. For example, if the detail report includes a list of allocation model item that are associated with the VMI, clicking/selecting one of the allocation model items may result in another drilldown report being generated that shows details about the selected allocation model item.

At decision block 1608, in at least one of the various embodiments, if additional drilldown information is available and requested, control may loop back to block 1604; otherwise, control may be returned to a calling process. In at least one of the various embodiments, the interactive report may be arranged to enable users to drilldown from the VMI to allocation model items, and, in at least one of the various embodiments, ultimately to the source information used to generate the allocation model. Accordingly, if the user does drilldown, additional interactive detail reports may be generated and displayed.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

Illustrative Use Cases

FIGS. 17-21 illustrate user-interface uses cases for visualizing the flow of resources in an allocation model, in accordance with at least one of the various embodiments.

Figure 17:
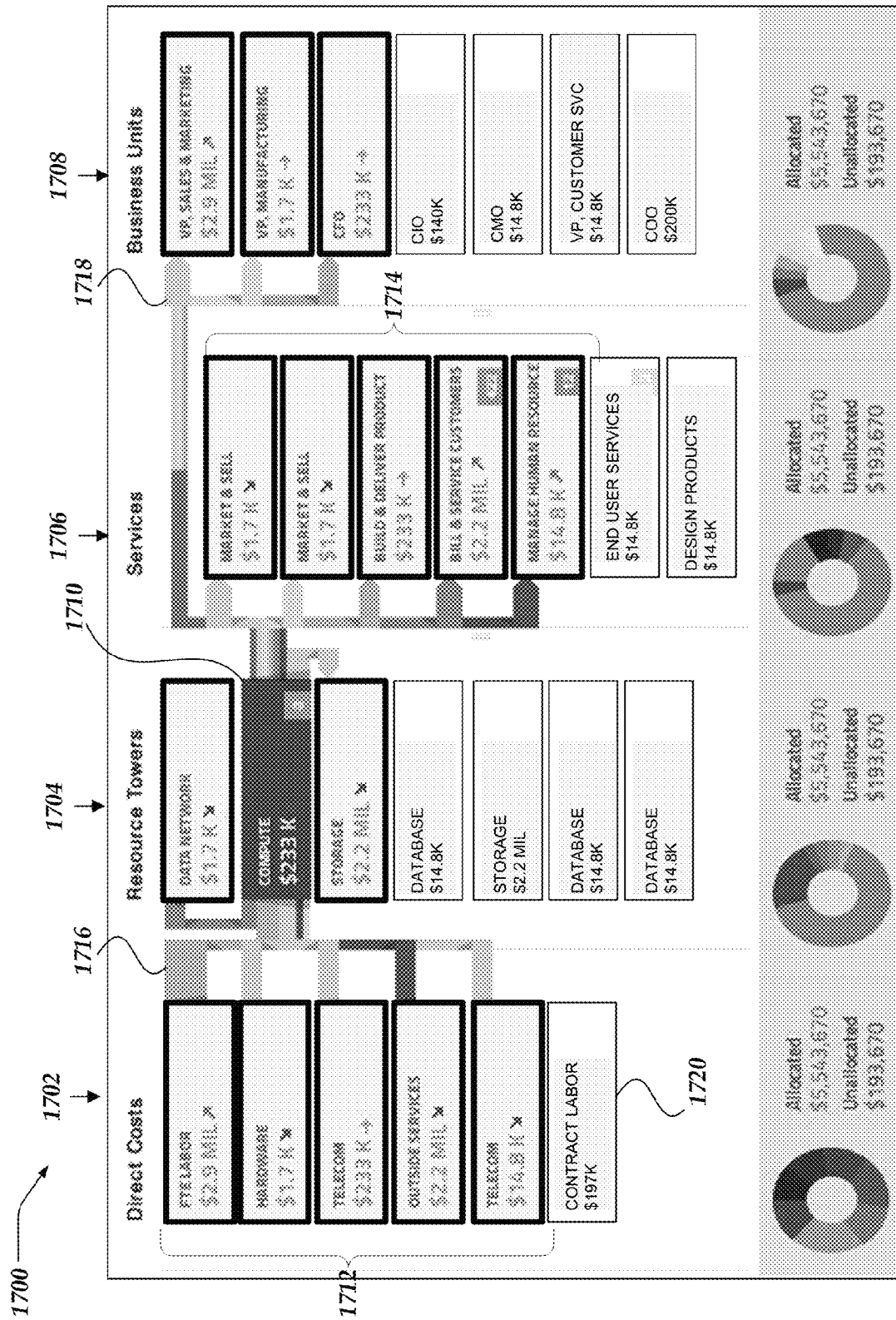
FIG. 17 illustrates a user-interface that is a display for visualizing the flow of resources in an allocation model, in accordance with at least one of the various embodiments.

FIG. 17 illustrates user-interface 1700 that is display for visualizing the flow of resources in an allocation model, in accordance with at least one of the various embodiments. In at least one of the various embodiments, interface 1700 displays various features of a visualization model.

In at least one of the various embodiments, user-interface 1700 displays a visualization model that has four tiers, direct costs 1702, resource towers 1704, services 1706, and business units 1708. Also, in this example, the visualization model item (VMI), VMI 1710, selected by a user is highlighted. Accordingly, in this example, resource flow lines from source VMIs 1712 are displayed and resource flow lines going to target VMIs, such as, target VMIs 1714.

Further, in this example, an outflow resource flow line, flow line 1716, is rendered with a width that is based on the proportion of the resources outflow to total resources of source VMI. Likewise, the inflow resource flow lines, such as, resource flow line 1718 are rendered to have width that based on the proportion the incoming resources are to the total resources of the target VMI.

Also, in at least one of the various embodiments, VMIs not involved in providing or receiving resources from the selected VMI are dimmed out. In this example, VMI 1720 (contract labor) is not a source or destination for resources associated with the selected VMI, VMI 1710. Accordingly, in this example, it is rendered in user-interface 1700 as dimmed.

In at least one of the various embodiments, user-interface may include additional summary user-interface elements, such as donut 1722 and summary label 1724.

Figure 18:
FIG. 18 illustrates a drill-down user-interface that displays detail information for visualizing the details of flow of resources into a visualization model item (VMI), in accordance with at least one of the various embodiments.

FIG. 18 illustrates drill-down user-interface 1800 that display detail information for visualizing the details of flow of resources into a visualization model item (VMI), in accordance with at least one of the various embodiments. In at least one of the various embodiments, user-interface 1800 displays various details of the allocation information that is associated with the selected VMI. In at least one of the various embodiments, user-interface enables a user to review details, including the actual allocation model items that have been aggregated into the VMI.

In at least one of the various embodiments, a user may select a VMI from a user-interface such as, user-interface 1700. By engaging drilldown actions, such as, right-clicking, menu item selection, hotkey activation, or the like, a display dialog such as user-interface 1800 may be presented to the user.

In at least one of the various embodiments, user interface 1800 may include a flow detail pane, such as, flow detail pane 1802. In at least one of the various embodiments, a flow detail pane may be arranged to provided a flow line legend that shows the source of the flow lines, the amount of resources it represents, or the like, or combination thereof.

In at least one of the various embodiments, a detail pane, such as, detail pane 1804 may include details showing the allocations, allocation rules, rollups, or the like, for the allocation model items that have been mapped to the selected VMI. In at least one of the various embodiments, to conserve user-interface space, user-interface 1800 may include two or more tabs, such as, tabs 1806, to that when activated, display other details associated with allocation model items and/or the selected VMI.

In at least one of the various embodiments, there may be more resource flows than can easily be displayed on flow detail pane 1802. Accordingly, in at least one of the various embodiments, a user-interface control, such as, control 1808 may be displayed to enable access to the detail information for flows that could not easily fit on the initial flow detail pane.

Figure 19:
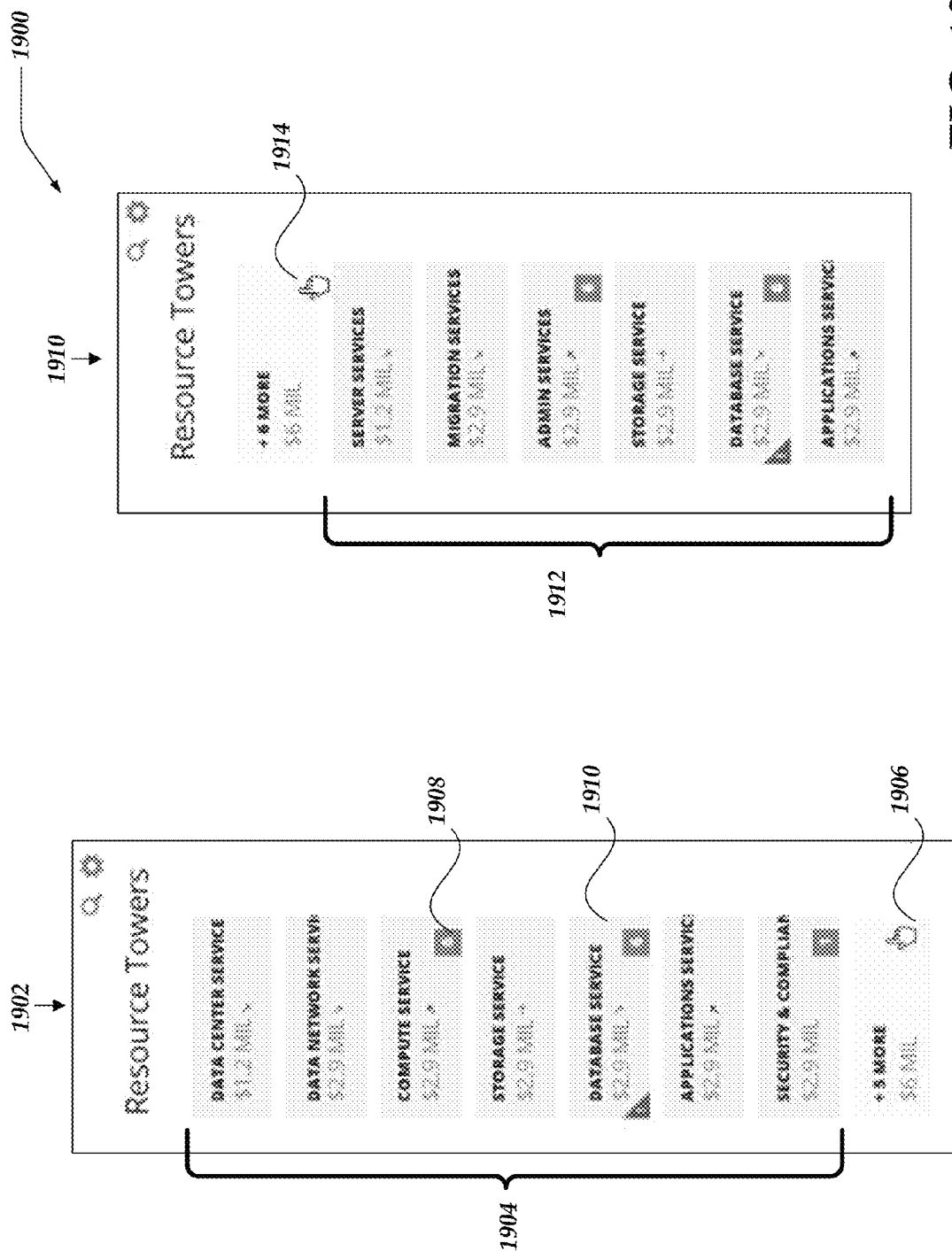
FIG. 19 illustrates a drill-down user-interface that includes user-interface controls for viewing visualization model items (VMIs) that may be unseen in the main display in accordance with at least one of the various embodiments.

FIG. 19 illustrates drill-down user-interface 1900 that includes user-interface controls for viewing visualization model items (VMIs) that may be unseen in the main display in accordance with at least one of the various embodiments. In at least one of the various embodiments, the visualization model may be displayed on a computer display that is not big enough to show all of the VMIs that are associated with a tier of the visualization model. In this example, tier view 1902 shows an example of VMIs displayed in a tier named Resource Towers. In this example, tier view 1902 displays VMIs 1904. Each of the individual VMI in VMIs 1904 is labelled with a name of the VMI and the aggregate amount of resources associated with the VMI, in this example, the resource is money.

In at least one of the various embodiments, the number of VMIs displayed in a tier view may depend on the geometry of the display device and/or other view conditions. In this example, seven VMIs are displayed in view 1902. However, control 1906 indicates that there are additional off-screen VMIs.

In at least one of the various embodiments, a user-interface control, such as, control 1906, may be arranged to show number of off-screen or otherwise unseen VMIs. Further, in at least one of the various embodiments, the aggregate resource value of the unseen VMIs may be displayed in control 1906 as well. Accordingly, in at least one of the various embodiments, a user may observe that there are a number of unseen VMIs in the tier, and how much of the resources they account for. Accordingly, in at least one of the various embodiments, a user may select a control, such as, control 1906 to display the unseen VMIs.

In at least one of the various embodiments, additional information may be shown in the displayed VMIs. In some embodiments, a visualization model may be arranged such that one or more of the VMIs are associated and related to other VMIs, in hierarchical, group, parent-child, or the like, relationships. In at least one of the various embodiments, a control, such as, control 1908 may be arranged and displayed to indicate that one or more VMIs are associated with/related to the VMI. In this example, control 1906 indicates that six other VMIs are child VMIs of the Compute Service VMI. Accordingly, in at least one of the various embodiments, if a user activates control 1906, the child VMIs may be displayed. (See, FIG. 20.)

Further, in at least one of the various embodiments, VMI controls, such as, VMI control 1910 may be arranged to display alert/notification indicators to draw the attention to the user. In this example, the lower left corner of VMI control 1910 is marked to indicate a condition that may need the attention of the user. For example, there may be a problem with the underlying allocation model such as, unallocated resources, undefined/improper allocation rules, or the like.

In at least one of the various embodiments, if a control, such as, control 1906 may be activated, tier view 1910 may be generated and displayed in place of tier view 1902. In some embodiments, VMIs, such as, VMIs 1912 that were hidden from view may be displayed. Also, in at least one of the various embodiments, similar to tier view 1902, a control may be displayed to previously viewable VMIs (e.g., VMIs 1904), such as, control 1914, may be displayed to inform the user about the unseen VMIs and to enable switching back to view, such as, tier view 1902.

In at least one of the various embodiments, each tier for a visualization model may be displayed using tier views similar as tier view 1902 and tier view 1910. In some embodiments, if all of the VMIs associated with a tier are visible, controls such as control 1906 and control 1914 may be omitted from the views.

Figure 20:
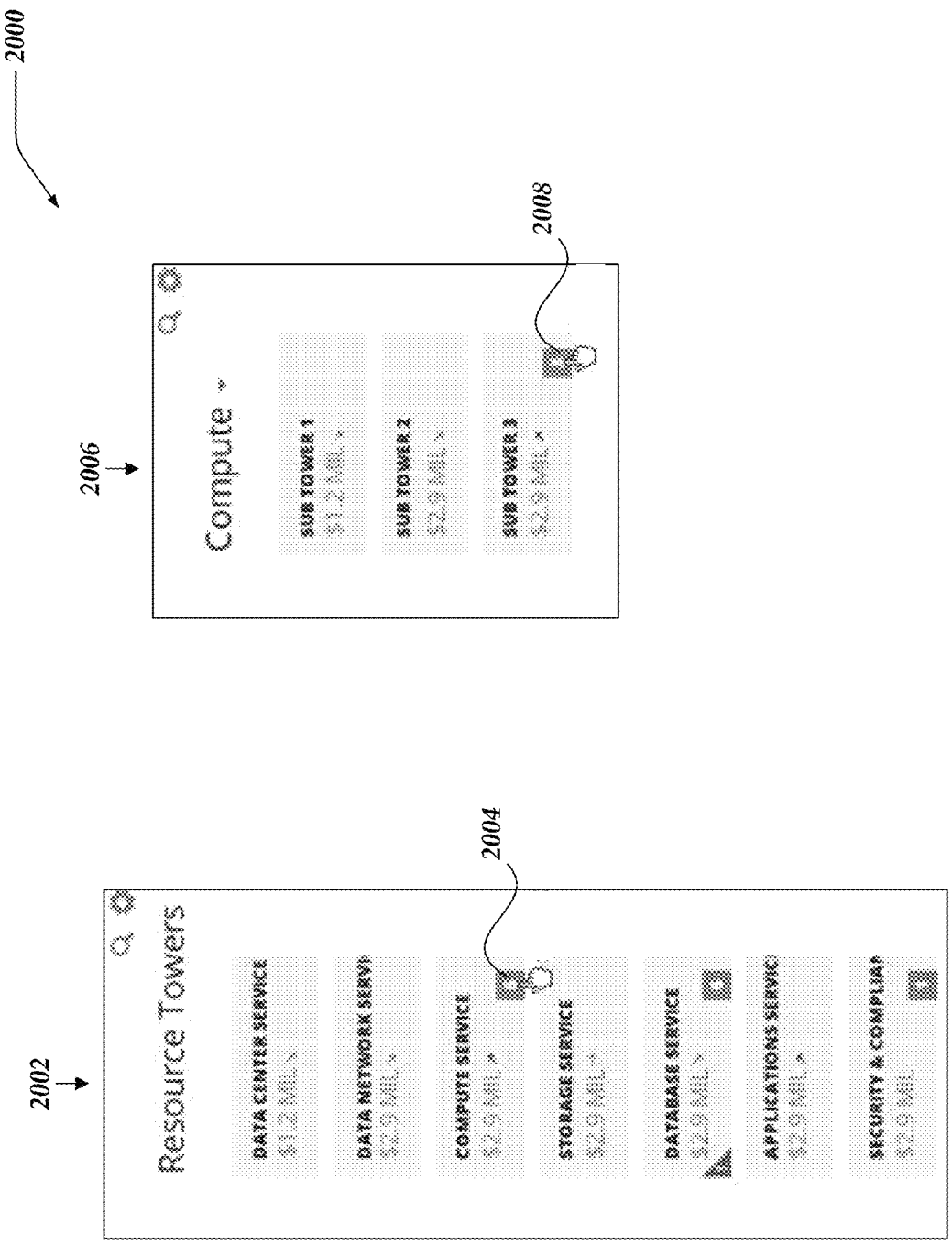
FIG. 20 illustrates the behavior of a user-interface that includes user-interface controls for viewing visualization model items (VMIs) that may be unseen in the main display in accordance with at least one of the various embodiments.

FIG. 20 illustrates the behavior of user-interface 2000 that includes user-interface controls for viewing visualization model items (VMIs) that may be unseen in the main display in accordance with at least one of the various embodiments. In at least one of the various embodiments, as mentioned, some VMIs may be organized using various relationships. In some case, VMIs may be arranged to be associated with one or more other VMIs. Such relationships may be hierarchal, groups, parent-child, or the like. Accordingly, in some embodiments, tier views, such as, tier view 2002 may be arranged to display VMIs that include child and/or group indicator, such as, VMI control 2004.

In at least one of the various embodiments, VMI controls may include labels, counters, or other indicators that may indicate that a VMI is associated with other VMIs. In this non-limiting example, VMI control 2004 has a user-interface element that indicates that a VMI is associated with more VMIs. One of ordinary skill in the art will appreciate that other user-interface elements may be employed to represent other conditions or relationships associated with a VMI.

In at least one of the various embodiments, if a user activates (e.g., clicks) a control, such as, VMI control 2004, the unseen associated VMIs may be displayed. In this example, view 2006 may be displayed to show one or more of the child VMIs associated with VMI control 2004. Further, in at least one of the various embodiments, one or more of the child VMIs may be associated with other VMIs. Accordingly, in at least one of the various embodiments, a control, such as, VMI control 2008 may be rendered and displayed to indicate the presence of the unseen child VMIs. And, in at least one of the various embodiments, activation of controls, such as, control 2008 may trigger the display of additional unseen VMIs.

What is claimed as new and desired to be protected by Letters Patent of the United States is:

1. A method for generating a computer visualization of data using a computer that includes one or more hardware processors, where each step of the method is performed by the one or more hardware processors, comprising:

selecting, by the one or more hardware processors, a visualization model based on at least an allocation model, wherein the visualization model includes one or more visualization model items;

mapping, by the one or more hardware processors, one or more allocation model items included in the allocation model to the one or more visualization model items;

providing, by the one or more hardware processors, a resource value for each of the one or more visualization model items by at least aggregating an amount of resources corresponding to each of their one or more mapped allocation model items;

storing, by the one or more hardware processors, the visualization model in a non-transitory memory of the computer, wherein the visualization model includes one or more resource values for the one or more visualization model items;

displaying, by the one or more hardware processors, one or more portions of the visualization model that overlays the allocation model in a user interface of the computer, wherein the allocation model underlies the visualization model; and when a visualization model item is selected using the user interface of the computer, the one or more hardware processors perform further actions, including:

traversing, by the one or more hardware processors, the underlying allocation model to identify one or more source allocation model items and one or more target allocation model items that are associated with the selected visualization model item;

providing, by the one or more hardware processors, one or more source visualization model items that provide resources to the selected visualization model item based on the one or more identified source allocation model items;

providing, by the one or more hardware processors, one or more target visualization model items that receive resources from the selected visualization model item based on the one or more identified target allocation model items;

displaying on the user interface, by the one or more hardware processors, one or more input flow lines that start from the one or more source visualization model items and end at the selected visualization model item; and displaying on the user interface, by the one or more hardware processors, one or more output flow lines that start from the selected visualization model item and end at the one or more target visualization model items.

2. The method of claim 1, wherein providing the one or more source visualization model items further comprises, providing the one or more source visualization model items based on the one or more source allocation model items that provide resources to the one or more target allocation model items that correspond to the selected visualization model item.

3. The method of claim 1, wherein providing the one or more target visualization model items further comprises, providing the one or more target visualization model items based on the one or more target allocation model items that receive resources from the one or more source allocation model items that correspond to the selected visualization model item.

4. The Method of claim 1, further comprising:
providing, by the one or more hardware processors, a remainder of visualization model items that are separate from the one or more source visualization model items, the one or more target visualization model items, and the selected visualization model item; and dimming on the user interface, by the hardware processors, one or more user-interface controls that correspond to the remainder of visualization model items.

5. The method of claim 1, further comprising, displaying on the user interface, by the one or more hardware processors, each resource value for the one or more visualization model items.

6. The method of claim 1, further comprising:
providing, by the one or more hardware processors, a displayed a flow line thickness at a beginning of a flow line originating from a source visualization model item based on a proportion of the source visualization model item's total resources and the amount of its resources that are provided to a target visualization model item; and providing, by the one or more hardware processors, another displayed flow line thickness at an end of the flow line that terminates at the target visualization model item based on a proportion of the target visualization model item's total resources and the amount of resources provided by the source visualization model item.

7. The method of claim 1, wherein the one or more visualization model items are arranged into one or more tiers of the visualization model that are displayed on the user interface.

8. The method of claim 1, further comprising, when a drill down action is performed on the user interface for the selected visualization model item, perform further actions, including:
providing, by the one or more hardware processors, one or more allocation details associated with the selected visualization model item; and generating, by the one or more hardware processors, an interactive report that includes at least the one or more allocation details, wherein the interactive report is executed on the user interface.

9. A system for generating a computer visualization of data, comprising:
a network computer, comprising:
a transceiver that communicates over the network;
a non-transitory memory that stores at least instructions; and
one or more processor devices that execute instructions that perform actions, including:
selecting a visualization model based on at least an allocation model, wherein the visualization model includes one or more visualization model items;
mapping one or more allocation model items included in the allocation model to the one or more visualization model items;
providing a resource value for each of the one or more visualization model items by at least aggregating an amount of resources corresponding to each of their one or more mapped allocation model items;
storing the visualization model in the memory, wherein the visualization model includes one or more resource values for the one or more visualization model items;
displaying one or more portions of the visualization model that overlays the allocation model in a user interface of the computer, wherein the allocation model underlies the visualization model; and
when a visualization model item is selected using the user interface of the network computer, the one or more processors execute instructions that perform further actions, including:
traversing the underlying allocation model to identify one or more source allocation model items and one or more target allocation model items that are associated with the selected visualization model item;

providing one or more source visualization model items that provide resources to the selected visualization model item based on the one or more identified source allocation model items;

providing one or more target visualization model items that receive resources from the selected visualization model item based on the one or more identified target allocation model items;

displaying on the user interface one or more input flow lines that start from the one or more source visualization model items and end at the selected visualization model item; and displaying on the user interface one or more output flow lines that start from the selected visualization model item and end at the one or more target visualization model items; and a client computer, comprising:
a transceiver that communicates over the network;
a memory that stores at least instructions; and
a processor device that executes instructions that perform actions, including:
displaying the visualization model on a client user interface; and
displaying the user-interface for interacting with the visualization model.

10. The system of claim 9, wherein providing the one or more source visualization model items further comprises, providing the one or more source visualization model items based on the one or more source allocation model items that provide resources to the one or more target allocation model items that correspond to the selected visualization model item.

11. The system of claim 9, wherein providing the one or more target visualization model items further comprises, providing the one or more target visualization model items based on the one or more target allocation model items that receive resources from the one or more source allocation model items that correspond to the selected visualization model item.

12. The system of claim 9, wherein the one or more network computer processor devices execute instructions that perform actions, further comprising:
providing a remainder of visualization model items that are separate from the one or more source visualization model items, the one or more target visualization model items, and the selected visualization model item; and
dimming on the user interface one or more user-interface controls that correspond to the remainder of visualization model items.

13. The system of claim 9, wherein the one or more network computer processor devices execute instructions that perform actions, further comprising, displaying on the user interface each resource value for the one or more visualization model items.

14. The system of claim 9, wherein the one or more network computer processor devices execute instructions that perform actions, further comprising:
providing a displayed a flow line thickness at a beginning of a flow line originating from a source visualization model item based on a proportion of the source visualization model item's total resources and the amount of its resources that are provided to a target visualization model item; and
providing another displayed flow line thickness at an end of the flow line that terminates at the target visualization model item based on a proportion of the target visualization model item's total resources and the amount of resources provided by the source visualization model item.

15. The system of claim 9, wherein the one or more visualization model items are arranged into one or more tiers of the visualization model that are displayed on the user interface.

16. The system of claim 9, wherein the one or more network computer processor devices execute instructions that perform actions further comprising, when a drill down action is performed on the user interface for the selected visualization model item, perform further actions, including:
providing one or more allocation details associated with the selected visualization model item; and
generating an interactive report that includes at least the one or more allocation detail, wherein the interactive report is executed on the user interface.

17. A processor readable non-transitory storage media that includes instructions for generating a computer visualization of data, wherein execution of the instructions by one or more hardware processors performs actions, comprising:
selecting a visualization model based on at least an allocation model, wherein the visualization model includes one or more visualization model items;
mapping one or more allocation model items included in the allocation model to the one or more visualization model items;
providing a resource value for each of the one or more visualization model items by at least aggregating an amount of resources corresponding to each of their one or more mapped allocation model items;
storing the visualization model in a non-transitory memory of a computer, wherein the visualization model includes one or more resource values for the one or more visualization model items;
displaying one or more portions of the visualization model that overlays the allocation model in a user interface of the computer, wherein the allocation model underlies the visualization model; and
when a visualization model item is selected using the user interface of the computer, performing further actions, including:
traversing the underlying allocation model to identify one or more source allocation model items and one or more target allocation model items that are associated with the selected visualization model item;
providing one or more source visualization model items that provide resources to the selected visualization model item based on the one or more identified source allocation model items;
providing one or more target visualization model items that receive resources from the selected visualization model item based on the one or more identified target allocation model items;
displaying one or more input flow lines that start from the one or more source visualization model items and end at the selected visualization model item; and
displaying one or more output flow lines that start from the selected visualization model item and end at the one or more target visualization model items.

18. The media of claim 17, wherein providing the one or more source visualization model items further comprises, providing the one or more source visualization model items based on the one or more source allocation model items that provide resources to the one or more target allocation model items that correspond to the selected visualization model item.

19. The media of claim 17, wherein providing the one or more target visualization model items further comprises, determining the one or more target visualization model items based on the one or more target allocation model items that receive resources from the one or more source allocation model items that correspond to the selected visualization model item.

20. The media of claim 17, further comprising:
providing a remainder of visualization model items that are separate from the one or more source visualization model items, the one or more target visualization model items, and the selected visualization model item; and
dimming on the user interface one or more user-interface controls that correspond to the remainder of visualization model items.

21. The media of claim 17, further comprising, displaying on the user interface each resource value for the one or more visualization model items.

22. The media of claim 17, further comprising:
providing a displayed flow line thickness at a beginning of a flow line originating from a source visualization model item based on a proportion of the source visualization model item's total resources and the amount of its resources that are provided to a target visualization model item; and
providing another displayed flow line thickness at an end of the flow line that terminates at the target visualization model item based on a proportion of the target visualization model item's total resources and the amount of resources provided by the source visualization model item.

23. The media of claim 17, further comprising, when a drill down action is performed on the user interface for the selected visualization model item, perform further actions, including:
providing one or more allocation details associated with the selected visualization model item; and
generating an interactive report that includes at least the one or more allocation details, wherein the interactive report is executed on the user interface.

24. A network computer for generating a computer visualization of data, comprising:
a transceiver that communicates over the network;
a non-transitory memory that stores at least instructions; and
one or more processor devices that execute instructions that perform actions, including:
selecting a visualization model based on at least an allocation model, wherein the visualization model includes one or more visualization model items;
mapping one or more allocation model items included in the allocation model to the one or more visualization model items;
providing a resource value for each of the one or more visualization model items by at least aggregating an amount of resources corresponding to each of their one or more mapped allocation model items;
storing the visualization model in the non-transitory memory of the computer, wherein the visualization model includes one or more resource values for the one or more visualization model items;
displaying one or more portions of the visualization model that overlays the allocation model in a user interface of the network computer, wherein the allocation model underlies the visualization model; and
when a visualization model item is selected using the user interface of the network computer perform further actions, including:
traversing the underlying allocation model to identify one or more source allocation model items and one or more target allocation model items that are associated with the selected visualization model item;
providing one or more source visualization model items that provide resources to the selected visualization model item based on the one or more identified source allocation model items;
providing one or more target visualization model items that receive resources from the selected visualization model item based on the one or more identified target allocation model items;
displaying on the user interface one or more input flow lines that start from the one or more source visualization model items and end at the selected visualization model item; and
displaying on the user interface one or more output flow lines that start from the selected visualization model item and end at the one or more target visualization model items.

25. The network computer claim 24, wherein providing the one or more source visualization model items further comprises, providing the one or more source visualization model items based on the one or more source allocation model items that provide resources to the one or more target allocation model items that correspond to the selected visualization model item.

26. The network computer claim 24, wherein providing the one or more target visualization model items further comprises, providing the one or more target visualization model items based on the one or more target allocation model items that receive resources from the one or more source allocation model items that correspond to the selected visualization model item.

27. The network computer claim 24, wherein the one or more processor device execute instructions that performs actions further comprising:
providing a remainder of visualization model items that are separate from the one or more source visualization model items, the one or more target visualization model items, and the selected visualization model item; and
dimming on the user interface one or more user-interface controls that correspond to the remainder of visualization model items.

28. The network computer claim 24, wherein the one or more processor devices execute instructions that perform actions, further comprising, displaying on the user interface each resource value for the one or more visualization model items.

29. The network computer claim 24, wherein the one or more processor devices execute instructions that perform actions further comprising:
providing a displayed flow line thickness at a beginning of a flow line originating from a source visualization model item based on a proportion of the source visualization model item's total resources and the amount of its resources that are provided to a target visualization model item; and
providing a displayed another flow line thickness at an end of the flow line that terminates at the target visualization model item based on a proportion of the target visualization model item's total resources and the amount of resources provided by the source visualization model item.

30. The network computer claim 24, wherein the one or more visualization model items are arranged into one or more tiers of the visualization model that are displayed on the user interface.

* * * * *